(12) United States Patent
Kitazato et al.

(10) Patent No.: US 10,743,082 B2
(45) Date of Patent: Aug. 11, 2020

(54) RECEPTION APPARATUS, RECEPTION METHOD, TRANSMISSION APPARATUS, AND TRANSMISSION METHOD

(71) Applicant: SONY CORPORATION, Tokyo (JP)

(72) Inventors: Naohisa Kitazato, Tokyo (JP); Yasuaki Yamagishi, Kanagawa (JP); Jun Kitahara, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/300,564

(22) PCT Filed: Mar. 27, 2015

(86) PCT No.: PCT/JP2015/059587
§ 371 (c)(1),
(2) Date: Sep. 29, 2016

(87) PCT Pub. No.: WO2015/156150
PCT Pub. Date: Oct. 15, 2015

(65) Prior Publication Data
US 2017/0134824 A1    May 11, 2017

(30) Foreign Application Priority Data

Apr. 11, 2014 (JP) ................................. 2014-081536

(51) Int. Cl.
*H04W 4/06* (2009.01)
*H04N 21/462* (2011.01)
(Continued)

(52) U.S. Cl.
CPC ...... *H04N 21/64322* (2013.01); *H04H 20/93* (2013.01); *H04L 65/4076* (2013.01);
(Continued)

(58) Field of Classification Search
None
See application file for complete search history.

(56) References Cited

U.S. PATENT DOCUMENTS

| 6,763,004 | B1 * | 7/2004 | De Oliveira | H04L 29/06 370/312 |
| 8,806,050 | B2 * | 8/2014 | Chen | H04L 65/607 709/227 |

(Continued)

FOREIGN PATENT DOCUMENTS

| CA | 2940324 A1 * | 10/2015 | ......... H04N 21/2385 |
| EP | 2 555 510 A2 | 2/2013 | |

(Continued)

OTHER PUBLICATIONS

Otsuki, et al., "A Study of MMT-based Data transmission scheme for Super Hi-Vision Satellite Broadcasting Systems", ITE Tech. Rep., vol. 38, No. 14, BCT2014-54, Mar. 2014, pp. 29-32.

(Continued)

*Primary Examiner* — Nasser M Goodarzi
*Assistant Examiner* — Terrika Peterson
(74) *Attorney, Agent, or Firm* — Oblon, McClelland, Maier & Neustadt, L.L.P.

(57) ABSTRACT

The present technology relates to a reception apparatus, a reception method, a transmission apparatus, and a transmission method, by which an increase in data size of signaling information transmitted by broadcasting can be suppressed. Provided is a reception apparatus including: a reception unit that receives a broadcast wave of digital broadcasting using an IP (Internet Protocol) transmission system; and a control unit that controls, on the basis of information for managing only a broadcast component transmitted by a broadcast wave of the digital broadcasting, which is first signaling information transmitted by a broadcast wave of the digital broadcasting, or information for managing at least one component (Continued)

of the broadcast component and a communication component transmitted by communication, which is second signaling information transmitted by communication, operations of respective units for acquiring the at least one component of the broadcast component and the communication component. The present technology is applicable to a television receiver, for example.

18 Claims, 40 Drawing Sheets

(51) Int. Cl.
  *H04H 20/93* (2008.01)
  *H04N 21/643* (2011.01)
  *H04L 29/06* (2006.01)
  *H04L 29/08* (2006.01)
  *H04N 21/2362* (2011.01)
  *H04N 21/434* (2011.01)
  *H04N 21/65* (2011.01)
  *H04N 21/858* (2011.01)
(52) U.S. Cl.
  CPC ........... *H04L 65/608* (2013.01); *H04L 67/02* (2013.01); *H04L 67/06* (2013.01); *H04N 21/2362* (2013.01); *H04N 21/4345* (2013.01); *H04N 21/65* (2013.01); *H04N 21/8586* (2013.01); *H04H 2201/16* (2013.01)

(56) References Cited

U.S. PATENT DOCUMENTS

| | | | | |
|---|---|---|---|---|
| 8,958,375 | B2* | 2/2015 | Watson | H04L 1/0083 |
| | | | | 370/329 |
| 9,281,847 | B2* | 3/2016 | Stockhammer | H03M 13/373 |
| 10,084,832 | B2* | 9/2018 | Kitahara | H04L 65/4076 |
| 10,362,076 | B2* | 7/2019 | Kitahara | |
| 2006/0015908 | A1* | 1/2006 | Vermola | H04N 7/17318 |
| | | | | 725/63 |
| 2008/0086569 | A1* | 4/2008 | Arora | H04L 12/2801 |
| | | | | 709/231 |
| 2009/0083794 | A1* | 3/2009 | Lee | H04H 20/93 |
| | | | | 725/39 |
| 2009/0268806 | A1* | 10/2009 | Kim | H04N 21/234327 |
| | | | | 375/240.01 |
| 2010/0017839 | A1 | 1/2010 | Song et al. | |
| 2010/0195633 | A1* | 8/2010 | Vare | H04W 36/385 |
| | | | | 370/338 |
| 2010/0232550 | A1* | 9/2010 | Lee | H04L 27/06 |
| | | | | 375/341 |
| 2011/0289542 | A1* | 11/2011 | Kitazato | H04N 21/2625 |
| | | | | 725/115 |
| 2012/0259994 | A1* | 10/2012 | Gillies | H04L 12/1881 |
| | | | | 709/231 |
| 2012/0275455 | A1 | 11/2012 | Hwang et al. | |
| 2013/0014202 | A1* | 1/2013 | Suh | H04H 20/93 |
| | | | | 725/131 |
| 2013/0219431 | A1 | 8/2013 | Hong et al. | |
| 2013/0271568 | A1* | 10/2013 | Park | H04N 21/4345 |
| | | | | 348/43 |
| 2013/0271657 | A1* | 10/2013 | Park | H04N 9/44 |
| | | | | 348/525 |
| 2013/0305304 | A1* | 11/2013 | Hwang | H04N 21/2381 |
| | | | | 725/109 |
| 2013/0346566 | A1* | 12/2013 | Kwon | H04N 21/4622 |
| | | | | 709/219 |
| 2015/0189486 | A1* | 7/2015 | Lee | H04W 4/06 |
| | | | | 370/259 |
| 2016/0173945 | A1* | 6/2016 | Oh | H04N 21/438 |
| | | | | 725/110 |
| 2016/0204887 | A1* | 7/2016 | Lee | H04H 20/71 |
| | | | | 375/295 |
| 2016/0227274 | A1* | 8/2016 | Oh | H04N 21/2362 |
| 2016/0234532 | A1* | 8/2016 | Lee | H04N 21/2381 |
| 2016/0269786 | A1* | 9/2016 | Lee | H04N 21/435 |
| 2017/0055025 | A1* | 2/2017 | Lee | H04N 21/235 |
| 2017/0195153 | A1* | 7/2017 | Kwak | H04L 27/2602 |
| 2017/0195340 | A1* | 7/2017 | Wang | H04L 63/108 |
| 2019/0268391 | A1* | 8/2019 | Kitahara | H04L 65/4076 |

FOREIGN PATENT DOCUMENTS

| | | | |
|---|---|---|---|
| EP | 3 054 691 A1 | 8/2016 | |
| EP | 3 054 696 A1 | 8/2016 | |
| EP | 3 062 521 A1 | 8/2016 | |
| EP | 3 119 102 A1 | 1/2017 | |
| JP | 2011-066556 A | 3/2011 | |
| JP | 2014-507878 A | 3/2014 | |
| WO | WO 2008/143446 A1 | 11/2008 | |
| WO | WO 2009145597 A2 * | 12/2009 | ............ H04H 20/22 |
| WO | 2012/157718 A | 11/2012 | |
| WO | 2012/157718 A1 | 11/2012 | |
| WO | 2013/019903 A | 2/2013 | |
| WO | 2013/019903 A1 | 2/2013 | |
| WO | WO 2015/049848 A1 | 4/2015 | |
| WO | WO 2015/052899 A1 | 4/2015 | |
| WO | WO 2015/122152 A1 | 8/2015 | |
| WO | WO 2015/151533 A1 | 10/2015 | |

OTHER PUBLICATIONS

Kazuhiro Otsuki et al.,"A Study of MMT-based Data Transmission Scheme for Super Hi-Vision Satellite Broadcasting Systems", ITE Technical Report, vol. 38, No. 14, Mar. 7, 2014, 12 pages including 8 pages of English Translation.
Extended European Search Report dated Jan. 3, 2018 in Patent Application No. 15775989.5, 11 pages.
Notification of Reason for Refusal dated Jan. 28, 2020 in corresponding Japanese Patent Application No. 2019-081553 (with English translation)(8 pages).
Shuichi Aoki, "A Study on MMT for Hybrid Delivery on Broadcase and Broadband," Review of Operation Method of MMTR for Linkage between Broadcast and Communication, Research Report of Information Processing Society of Japan, Audio-Visual Composite Information Process (AVM), Japan, Information Processing Society of Japan, Feb. 21, 2014, 2014-AVM-84 No. 2, pp. 1-6 (6 pages).

* cited by examiner

FIG. 14

| Element/Attribute (with@) | | | | | Cardinality | Description |
|---|---|---|---|---|---|---|
| Scd | | | | | 1 | Service configuration description |
| | @majorProtocol version | | | | 0..1 | Major Protocol Version default = "1! |
| | @mainorProtocol version | | | | 0..1 | Major Protocol Version default = "0! |
| | @RFchannel Id | | | | 1 | RF channel ID |
| | @name | | | | 0..1 | Broadcast name for each Physical channel |
| | Turning RF | | | | 1 | |
| | | @frequency | | | 1 | Center frequency of this RF channel |
| | | PreambleL 1Pre | | | 0..1 | Preamble L1-pre data |
| | BBPStream | | | | 1..n | BBP stream |
| | | @bbpStream Id | | | 1 | BBP stream ID |
| | | @payloadType | | | 1 | BBP payload type "ipv4", "ipv6", "ts" |
| | | @name | | | 0..1 | BBP stream name |
| | | ESGBootstrap | | | 0..1 | Access information for ESG |
| | | | ESGProvider | | 1..n | ESG provider |
| | | | | @providerName | 1 | ESG provider name |
| | | | | ESGBroadcastLocation | 0..1 | ESG location from broadcast |
| | | | | @RFchannel Id | 1 | RF channel ID for ESG service |
| | | | | @BBPStream Id | 1 | BBP stream ID for ESG service |
| | | | | @ESGService Id | 1 | Service ID for ESG service |
| | | | | ESGBroadbandLocation | 0..1 | ESG location from broadband |
| | | | | @ESGur l | 1 | URL for ESG files |
| | | ClockReferenceInformation | | | 0..1 | Colck reference related information |
| | | | @source IPAddress | | 1 | Source IP address for Clock reference transmission |
| | | | @destinationIPAddress | | 1 | Destination IP address for Clock reference transmission |
| | | | @portNum | | 1 | UDP port number for Clock reference transmission |
| | | | @clockReferenceFormat | | 0..1 | Colck reference typy "NTPnormal", "NTP27M" |
| | | Tuning_BBPS | | | 1 | Physical parameter |
| | | | @plpId | | 1 | PLP id for this BBP stream |
| | | | PreambleL 1post | | 0..1 | |
| | | Service | | | 1..n | Service |
| | | | @serviceId | | 1 | Service ID |
| | | | @serviceType | | 1 | Service type "continuous", scripted", "esg" |
| | | | @hidden | | 0..1 | Hidden service or not "on", "OFF" |
| | | | @hiddenGuide | | 0..1 | Hidden service on ESG "on", "OFF" |
| | | | @shortName | | 1 | Short service name ≤7 character |
| | | | @longName | | 0..1 | Long service name |
| | | | @accessControl | | 0..1 | Access controlled service or not "on", "OFF" |
| | | | SourceOrigin | | 1 | Original service as source |
| | | | | @country | 1 | Country code |
| | | | | @original RFChannel Id | 1 | Original RF channel ID |
| | | | | @bbpStreamId | 1 | BBP stream ID |
| | | | | @serviceId | 1 | Service ID |
| | | | SCSbootstrap | | 1 | Access information for service channel |
| | | | | @hybrid | 0..1 | Signaling scope "basic" /" hybrid" |
| | | | | @source IPAddress | 1 | Source IP address to transmit service |
| | | | | @destinationIPAddress | 1 | Destination IP address to transmit service |
| | | | | @portNum | 1 | Port number to transmit SCS |
| | | | | @tsi | 1 | FLUTE Session TSI to transmit SCS |
| | | | SignalingOverInternet | | 0..1 | |
| | | | | @hybrid | 0..1 | Signaling scope "basic" /" Hybrid" |
| | | | | @url | 1 | Signaling URL (file including USD) |
| | | | AssociatedService | | 0..n | Associated service |
| | | | | @RFChannel Id | 0..1 | RF channel ID |
| | | | | @bbpStreamId | 0..1 | BSP stream ID |
| | | | | @serviceId | 1 | Service ID |

| Element/Attribute(with@) | Cardinality | Description |
|---|---|---|
| Spd | | Service parameter description |
| @serviceId | 1 | service identifier (major+minor) |
| @spIndicator | 0..1 | Service protection off/on |
| ProtocolVersionDescription | 0..1 | Data transmission protocol type&version |
| NRTServiceDescription | 0..1 | NRT service configuration |
| CapabilityDescription | 0..1 | Receiver capability to be required |
| IconDescription | 0..1 | Icon location for NRT service |
| ISO639LanguageDescription | 0..1 | Language for NRT service |
| ReceiverTargetingDescription | 0..1 | Targeting information |
| AssociatedServiceDescription | 0..1 | Pointer to its associated service |
| ContentAdvisoryDescription | 1 | Rating information |
| SignalingOverInternet | 0..1 | Information about signaling via internet |
| @hybrid | 0..1 | Signaling scope "basic" / "hybrid" |
| @version | 0..1 | Version number of signaling via internet |
| @url | 1 | Signaling file URL |

SPD

FIG.15

| SPD | | |
|---|---|---|
| Element/Attribute(with@) | Cardinality | Description |
| Spd | 1 | Service parameter description |
|   @serviceId | 1 | service identifier (major+minor) |
|   @spIndicator | 0..1 | Service protection off/on |
|   ProtocolVersionDescription | 0..1 | Data transmission protocol type&version |
|   NRTServiceDescription | 0..1 | NRT service configuration |
|   CapabilityDescription | 0..1 | Receiver capability to be required |
|   IconDescription | 0..1 | Icon location for NRT service |
|   ISO639LanguageDescription | 0..1 | Language for NRT service |
|   ReceiverTargetingDescription | 0..1 | Targeting information |
|   AssociatedServiceDescription | 0..1 | Pointer to its associated service |
|   ContentAdvisoryDescription | 1 | Rating information |
|   SignalingOverInternet | 0..1 | Information about signaling via internet |
|     @hybrid | 0..1 | Signaling scope "basic" / "hybrid" |
|     @version | 0..1 | Version number of signaling via internet |
|     @url | 1 | Signaling file URL |
|   Component | 1..n | Component signal (Elementary Stream) |
|     @componentId | 1 | Component identification (Identical to representation_id of MPD) |
|     @componentType | 1 | Component type by mime type |
|     @componentEncryption | 0..1 | Component level encryption "on", "off" |
|     ComponentLocation | 1 | Component Location information |
|     TargetedDeviceDescriptor | 0..m | Target device indication <Under study> |
|     ContentAdvisoryDescriptor | 0..1 | Rating information |
|     VideoParameters | 0..m | Video parameters (mainly depend on codec) |
|       AVCVideoDescriptor | 0..1 | Video parameters in case of AVC |
|       HEVCVideoDescriptor | 0..1 | Video parameters in case of HEVC |
|     AudioParameters | 0..1 | Audio parameters (mainly depend on codec) |
|       MPEG4AACAudioDescriptor | 0..1 | Audio parameters in case of MPEG4-AAC |
|       AC3AudioDescriptor | 0..1 | Audio parameters in case of AC3 |
|     CaptionParameters | 0..1 | Closed Caption parameters |

FIG.16

| Element/Attribute (with@) | Cardinality | Description |
|---|---|---|
| ComponentLocation | | |
| @portNumber | 0..1 | UDP port number for the component |
| @tsi | 0..1 | TSI for the component |
| @startToi | 1 | Start TOI value |
| @endToi | 0..1 | End TOI value |

ComponentLocation

SPD

| Element/Attribute(with@) | Cardinality | Description |
|---|---|---|
| Spd | | Service parameter description |
| @serviceId | 1 | service identifier (major+minor) |
| @spIndicator | 1 | Service protection off/on |
| ProtocolVersionDescription | 0..1 | Data transmission protocol type&version |
| NRTServiceDescription | 0..1 | NRT service configuration |
| CapabilityDescription | 0..1 | Receiver capability to be required |
| IconDescription | 0..1 | Icon location for NRT service |
| ISO639LanguageDescription | 0..1 | Language for NRT service |
| ReceiverTargetingDescription | 0..1 | Targeting information |
| AssociatedServiceDescription | 0..1 | Pointer to its associated service |
| ContentAdvisoryDescription | 1 | Rating information |
| SignalingOverInternet | 0..1 | Information about signaling via internet |
| @hybrid | 0..1 | Signaling scope  "basic" / "hybrid" |
| @version | 0..1 | Version number of signaling via internet |
| @url | 1 | Signaling file URL |
| @minUpdatePeriod | 0..1 | Assumed minimum update period for whole signaling data via internet |
| @endtime | 0..1 | End time of valid signaling data via internet |

| Element/Attribute(with@) | Cardinality | Description |
|---|---|---|
| ProtocolVersionDescriptor | | |
| @protocolIdentifier | 1 | Data service type "A/90", "NRT" |
| @majorProtocolVersion | 1 | Major version of data service specification |
| @minorProtocolVersion | 1 | Minor version of data service specification |

Protocol Version Descriptor element

FIG.19

NRT Service Descriptor element

| Element/Attribute(with@) | Cardinality | Description |
|---|---|---|
| NRTServiceDescriptor | | |
| @ConsumptionModel | 1 | NRT Consumption model "B&D", "push", "portal", "triggered" |
| @autoUpdate | 0..1 | Auto-updated service or not "on", "off" |
| @storageReservarion | 0..1 | Required storage size (Kbytes) |
| @defaultContentSize | 0..1 | Default NRT content size (bytes) |

FIG.20

| Element/Attribute(with@) | Cardinality | Description |
|---|---|---|
| CapabilityDescriptor | 0..1 | Receiver capability to be required |
| IndividualCapabilityCodes | 0..n | |
| @essentialIndicator | 0..1 | The capability is essential or not |
| @capabilityCode | 1 | Code representing a specific capability |
| @formatIdentifier | 0..1 | In case of capabilityCode represents private use, related data format targeting for capability check. |
| IndividualCapabilityString | 0..n | |
| @essentialIndicator | 0..1 | The capability is essential or not |
| @capabilityCategoryCode | 1 | Code representing a capability category |
| @capabilityString | 0..1 | Text string representing a capability check item in the capability category above. |
| CapabilityOrSets | 0..n | Capability combined condition of capability code and capability string with "OR" logic. |
| @essentialIndicator | 0..1 | The capability is essential or not |
| CapabilityCodesInSets | 0..m | |
| @capabilityCode | 1 | Code representing a specific capability |
| @formatIdentifier | 0..1 | In case of capabilityCode represents private use, related data format targeting for capability check |
| CapabilityStringsInSets | 0..m | Text string representing a capability check item in the capability category above |
| @capability_category_code | 1 | Code representing a capability category |
| @capabilityString | 0..1 | Text string representing a capability check item in the capability category above. |

FIG.21

Icon Descriptor element

| Element/Attribute (with@) | Cardinality | Description |
|---|---|---|
| IconDescriptor | | |
| @content_linkage | 1 | URL for Icon content |

FIG.22

[ISO-639 Language Descriptor element]

| Element/Attribute(with@) | Cardinality | Description |
|---|---|---|
| ISO639LanguageDescriptor | | |
| @languageCode | 1 | ISO-639 language code |

FIG.23

| Element/Attribute(with@) | Cardinality | Description |
|---|---|---|
| ReceiverTargetingDescriptor | | |
| TargetEntry | 1..n | Targeting Target Item |
| @geoLocation | 0..1 | Target Geographic location (3byte code) |
| @postalCode | 0..1 | Target postal code (2byte code) |
| @demographic category | 0..n | Targeting demographic attributes "males", "females", "Ages 12-17", etc |

FIG.24

| Associated Service Descriptor element | | |
|---|---|---|
| Element/Attribute(with@) | Cardinality | Description |
| AssociatedServiceDescriptor | | |
| @RFChannelId | 1 | RF channel identifier |
| @BBPStreamId | 1 | BBP stream identifier |
| @serviceId | 1 | Service identifier |

FIG.25

| Element/Attribute (with@) | Cardinality | Description |
|---|---|---|
| ContentAdvisoryDescriptor | | |
| @version | 1 | RRT version |
| RatingRegion | 1..n | Rating region information |
| @ratingRegionId | 0..1 | Rating region identifier |
| RatingDimension | 1..m | |
| @dimensionIndex | 1 | Rating dimension index |
| @ratingValue | 1 | Rating value corresponding to the dimension index abive |
| @ratingTag | 1 | Rating tag |

Content Advisory Descriptor element

| Element/Attribute (with@) | AVC Video Descriptor element | | |
|---|---|---|---|
| | Cardinality | Description | |
| AVCVideoDescriptor | | | |
| @profileIdc | 1 | A partial copy of SPS (from profile_idc to level_id) | |
| @constraintSet0 | 0..1 | | |
| @constraintSet1 | 0..1 | | |
| @constraintSet2 | 0..1 | | |
| @AVCCompatibleFlags | 1 | | |
| @levelIdc | 1 | | |
| @stillPresent | 0..1 | AVC still picture usage | |
| @24HourPicture | 0..1 | AVC 24-hour pictures usage | |

HEVC Video Descriptor element

| Element/Attribute (with@) | Cardinality | Description |
|---|---|---|
| AVCVideoDescriptor | | |
| @profileSpace | 1 | Partial copy of profile/tier/level parameters in VPS/SPS. |
| @tierFlag | 1 | |
| @profileIdc | 0..1 | |
| @profileCompatibilityIndication | 0..1 | |
| @progressiveSourceFlag | 0..1 | |
| @nonPackedConstraintFlag | 0..1 | |
| @frameOnlyConstraintFlag | 0..1 | |
| @levelIdc | 1 | |
| @temporalLayerSubsetFlag | 0..1 | |
| @stillPresent | 0..1 | HEVC still picture usage |
| @24HourPicture | 0..1 | HEVC 24-hour pictures usage |
| @temporalIdMin | 0..1 | |
| @temporalIdMax | 0..1 | |

FIG.28

| Element/Attribute(with@) | Cardinality | Description |
|---|---|---|
| MPEG4AACAudioDescriptor | | |
| @profile | 1 | AAC profile |
| @level | 1 | AAC level |
| @channelConfig | 0..1 | Channel configurations which indicates speaker mapping |
| @AACServiceType | 0..1 | Audio service type "CM", "ME", "VI", "HI", "D", "C" |
| @receiverMixRqd | 0..1 | Partial service or not "on", "off" |
| @mainId | 0..1 | Audio Main Service tag "1" ~ |
| @asvc | 1 | Main/sub audio service |
| @language | 0..1 | Language code |
| @componentName | 0..1 | Audio component name |

MPEG4 AAC Audio Descriptor element

FIG.29

| Element/Attribute(with@) | Cardinality | Description |
|---|---|---|
| AC3AudioDescriptor | | |
| @sampleRateCode | 1 | |
| @bsid | 1 | |
| @bitRateCode | 1 | |
| @surroundMode | 0..1 | |
| @bsMod | 1 | Audio service type "CM", "ME", "VI", "HI", "D", "C" |
| @numChannels | 1 | |
| @fullSvc | 1 | |
| @langcod | 1 | |
| @mainId | 1 | |
| @priority | 1 | |
| @textCod | 1 | |
| @language | 1 | |

AC3 Audio Descriptor element

FIG.30

| Element/Attribute (with@) | Cardinality | Description |
|---|---|---|
| CaptionParameters | | |
| @captionServiceNumber | 1 | Caption service number |
| @language | 1 | Caption language |
| @easyReader | 1 | 0: normal 1: easy reader |
| @wideAspectRatio | 1 | 0: 4:3 1: 16:9 |

Caption Parameters element

FIG.31

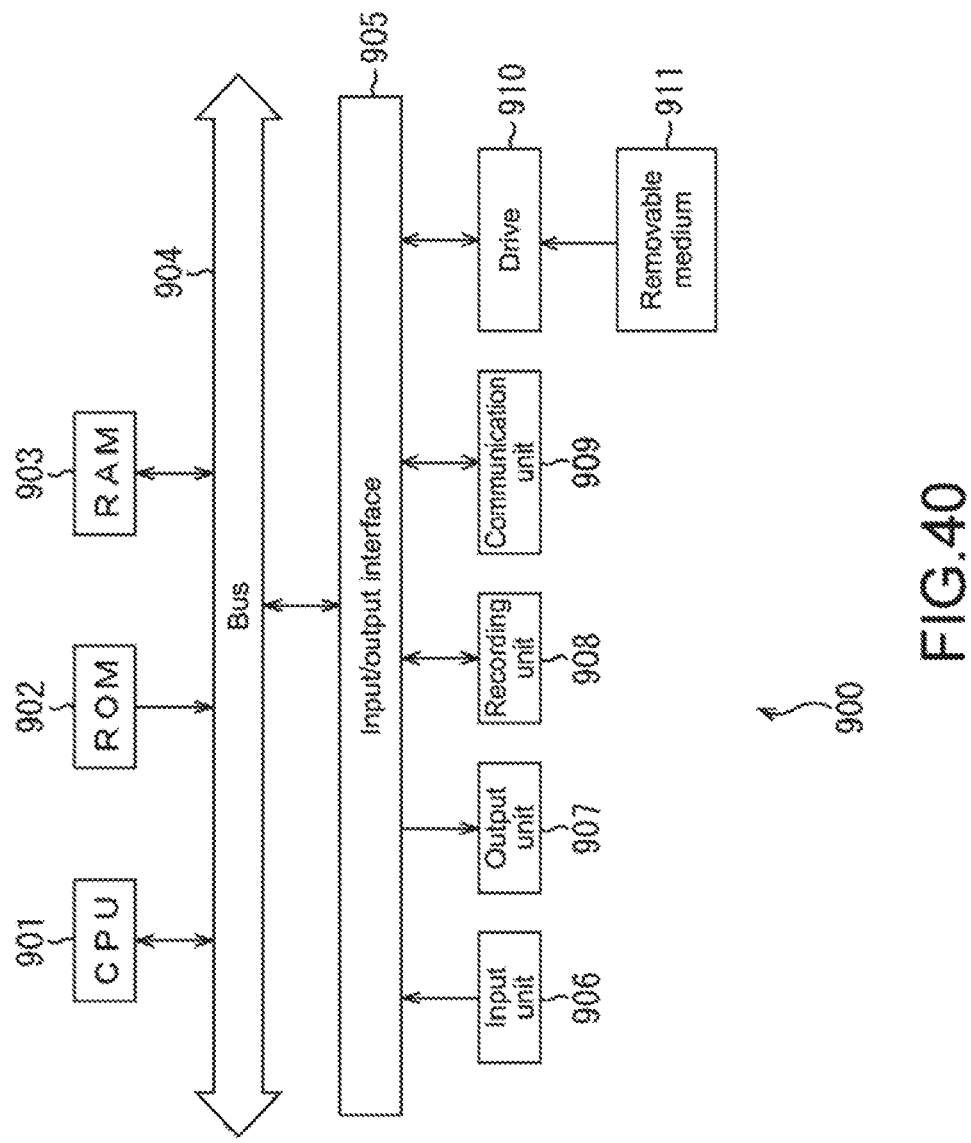

RECEPTION APPARATUS, RECEPTION METHOD, TRANSMISSION APPARATUS, AND TRANSMISSION METHOD

CROSS REFERENCE TO RELATED APPLICATIONS

This application is a U.S. National Phase of International Patent Application No. PCT/JP2015/059587 filed on Mar. 27, 2015, which claims priority benefit of Japanese Patent Application No. JP 2014-081536 filed in the Japan Patent Office on Apr. 11, 2014. Each of the above-referenced applications is hereby incorporated herein by reference in its entirety.

TECHNICAL FIELD

The present technology relates to a reception apparatus, a reception method, a transmission apparatus, and a transmission method and more particularly to a reception apparatus, a reception method, a transmission apparatus, and a transmission method, by which an increase in data size of signaling information transmitted by broadcasting can be suppressed.

BACKGROUND ART

In recent years, in the fields of digital broadcasting, in addition to services utilizing broadcasting, hybrid services cooperating with communication have been introduced (e.g., see Patent Document 1). In such hybrid services, components such as video, audio, and closed captions for providing those services are transmitted by broadcasting or communication as streams.

Patent Document 1: Japanese Patent Application Laid-open No. 2011-66556

SUMMARY OF INVENTION

Problem to be Solved by the Invention

By the way, if the hybrid services are introduced, it is necessary to describe information relating to broadcasting and communication in signaling information. Thus, an increase in data size of the signaling information transmitted by broadcasting is assumed. Therefore, the data size of the signaling information transmitted by broadcasting is required to be reduced.

The present technology has been made in view of the above-mentioned circumstances to be capable of suppressing an increase in data size of signaling information transmitted by broadcasting.

Means for Solving the Problem

A reception apparatus according to a first aspect of the present technology is a reception apparatus including: a reception unit that receives a broadcast wave of digital broadcasting using an IP (Internet Protocol) transmission system; and a control unit that controls, on the basis of information for managing only a broadcast component transmitted by a broadcast wave of the digital broadcasting, which is first signaling information transmitted by a broadcast wave of the digital broadcasting, or information for managing at least one component of the broadcast component and a communication component transmitted by communication, which is second signaling information transmitted by communication, operations of respective units for acquiring the at least one component of the broadcast component and the communication component.

The first signaling information may be information in units of services and may include a plurality of management information items for acquiring the broadcast component transmitted through a FLUTE (File Delivery over Unidirectional Transport) session.

The first signaling information may be information in units of services and may include one management information item obtained by integrating a plurality of management information items for acquiring the broadcast component transmitted through a FLUTE session as a parameter defined at a component level.

The first signaling information and the second signaling information may include management information defining information relating to the second signaling information as a parameter at a service level.

The management information may include information indicating a range of signaling information, a version information, and a URL (Uniform Resource Locator) indicating an acquisition source, as the information relating to the second signaling information.

The management information may further include information indicating an update interval of the second signaling information, as the information relating to the second signaling information.

The management information may further include information indicating a timing to terminate acquisition of the second signaling information, as the information relating to the second signaling information.

The second signaling information may be information in units of services and may include a plurality of management information items for acquiring the broadcast component and an MPD (Media Presentation Description) complying with a standard of MPEG-DASH (Moving Picture Expert Group-Dynamic Adaptive Streaming over HTTP) as management information for acquiring the communication component.

The first signaling information may be transmitted in an upper layer than an IP layer in a hierarchy of a protocol in the IP transmission system, and a common IP address may be assigned to the broadcast component configuring a particular service and the first signaling information.

The reception apparatus may be an independent apparatus or may be an internal block configuring a single apparatus.

A reception method according to the first aspect of the present technology is a reception method corresponding to the reception apparatus according to the first aspect of the present technology.

In the reception apparatus according to the first aspect of the present technology, and a reception method, a broadcast wave of digital broadcasting using an IP transmission system is received, and, on the basis of information for managing only a broadcast component transmitted by a broadcast wave of the digital broadcasting, which is first signaling information transmitted by a broadcast wave of the digital broadcasting, or information for managing at least one component of the broadcast component and a communication component transmitted by communication, which is second signaling information transmitted by communication, operations of respective units for acquiring the at least one component of the broadcast component and the communication component are controlled.

A transmission apparatus according to a second aspect of the present technology is a transmission apparatus including: a first acquisition unit that acquires first signaling information for managing only a broadcast component transmitted by a broadcast wave of digital broadcasting using an IP transmission system; a second acquisition unit that acquires one or more broadcast components configuring a service; and a transmission unit that transmits the first signaling information together with the broadcast component by a broadcast wave of the digital broadcasting using the IP transmission system.

The first signaling information may be information in units of services and may include a plurality of management information items for acquiring the broadcast component transmitted through a FLUTE session.

The first signaling information may be information in units of services and may includes one management information item obtained by integrating a plurality of management information items for acquiring the broadcast component transmitted through a FLUTE session as a parameter defined at a component level.

A receiver that receives a broadcast wave of the digital broadcasting using the IP transmission system may be capable of acquiring information for managing the at least one component of the broadcast component and a communication component transmitted by communication, which is second signaling information transmitted by communication, and the first signaling information and the second signaling information may include management information defining information relating to the second signaling information as a parameter at a service level.

The management information may include information indicating a range of signaling information, version information, and a URL of an acquisition source, as the information relating to the second signaling information.

The management information may further include information indicating an update interval of the second signaling information, as the information relating to the second signaling information.

The management information may further include information indicating a timing to terminate acquisition of the second signaling information, as the information relating to the second signaling information.

The second signaling information may be information in units of services and may include an MPD complying with a standard of MPEG-DASH as the plurality of management information items for acquiring the broadcast component and the management information for acquiring the communication component.

The first signaling information may be transmitted in an upper layer than an IP layer in a hierarchy of a protocol in the IP transmission system, and a common IP address may be assigned to the broadcast component configuring a particular service and the first signaling information.

The transmission apparatus may be an independent apparatus or may be an internal block configuring a single apparatus.

A transmission method according to the second aspect of the present technology is a transmission method corresponding to the transmission apparatus according to the second aspect of the present technology.

In the transmission apparatus according to the second aspect of the present technology and a transmission method, first signaling information for managing only a broadcast component transmitted by a broadcast wave of digital broadcasting using an IP transmission system is acquired, one or more broadcast components configuring the service is acquired, and the first signaling information is transmitted together with the broadcast component by a broadcast wave of the digital broadcasting using the IP transmission system.

Effects of the Invention

In accordance with the first aspect and the second aspect of the present technology, it is possible to suppress an increase in data size of signaling information transmitted by broadcasting.

It should be noted that the effect described here is not necessarily limitative and may be any effect described in the present disclosure.

BRIEF DESCRIPTION OF DRAWINGS

FIG. 14 A diagram showing a syntax of an SCD common to Solutions 1 and 2.

FIG. 15 A diagram showing an SPD according to Solution 1.

FIG. 16 A diagram showing an SPD according to Solution 2.

FIG. 17 A diagram showing details of a ComponentLocation element.

FIG. 18 A diagram showing an SPD common to Solutions 1 and 2.

FIG. 19 A diagram showing a syntax of a Protocol Version Descriptor.

FIG. 20 A diagram showing a syntax of an NRT Service Descriptor.

FIG. 21 A diagram showing a syntax of a Capability Descriptor.

FIG. 22 A diagram showing a syntax of an Icon Descriptor.

FIG. 23 A diagram showing a syntax of an ISO-639 Language Descriptor.

FIG. 24 A diagram showing a syntax of a Receiver Targeting Descriptor.

FIG. 25 A diagram showing a syntax of an Associated Service Descriptor.

FIG. 26 A diagram showing a syntax of a Content Advisory Descriptor.

FIG. 27 A diagram showing a syntax of an AVC Video Descriptor.

FIG. 28 A diagram showing a syntax of an HEVC Video Descriptor.

FIG. 29 A diagram showing a syntax of an MPEG4 AAC Audio Descriptor.

FIG. 30 A diagram showing a syntax of an AC3 Audio Descriptor.

FIG. 31 A diagram showing a syntax of Caption Parameters.

FIG. 40 A diagram showing a configuration example of a computer.

MODE(S) FOR CARRYING OUT THE INVENTION

Hereinafter, embodiments of the present technology will be described with reference to the drawings. Note that descriptions will be made in the following order.
1. Outline of Digital Broadcasting in IP Transmission System
2. Solution 1
(1) Structure of Signaling Information
(2) Specific Application Example
3. Solution 2
(1) Structure of Signaling Information
(2) Specific Application Example
4. Common to Solutions 1 and 2
(1) Structure of Signaling Information
(2) Specific Application Example
5. Syntax
(1) Syntax of SCD
(2) Syntax of SPD
6. System Configuration
7. Flows of Processing Executed by Apparatuses
8. Configuration of Computer
   <1. Outline of Digital Broadcasting in IP Transmission System>
   (Protocol Stack)
   FIG. 1 is a diagram showing a protocol stack of digital broadcasting in an IP transmission system.

Figure 1:
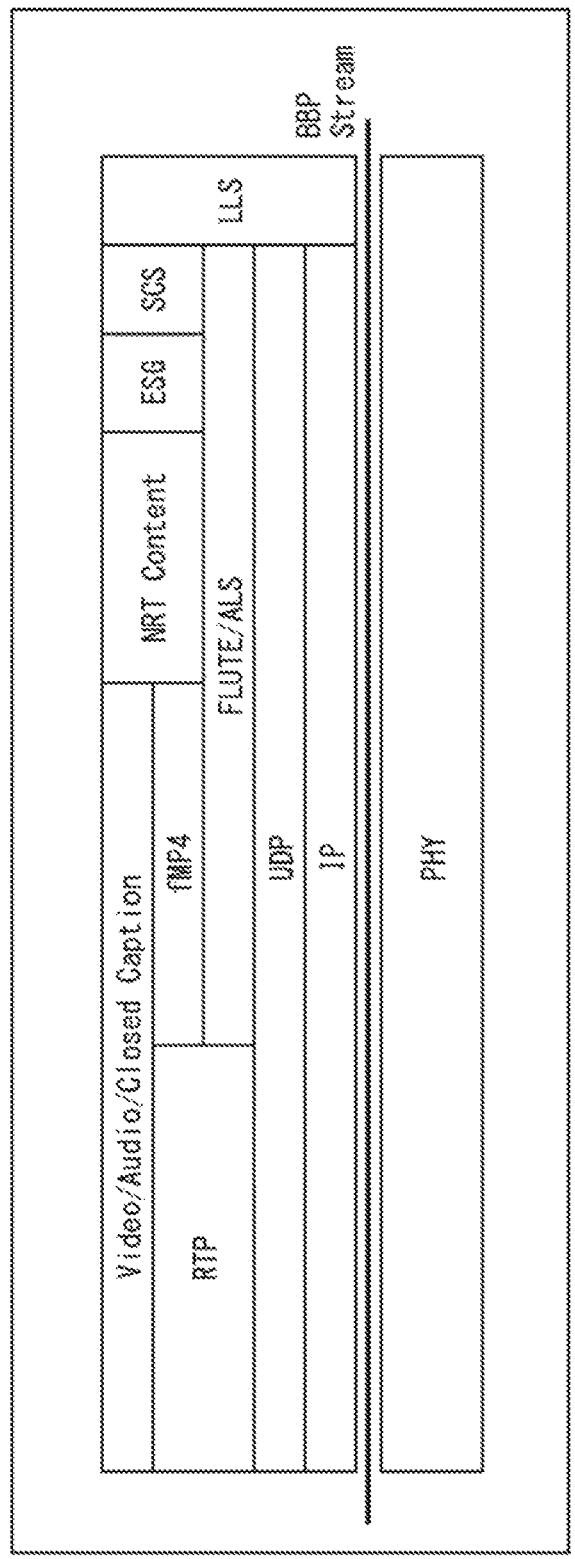
FIG. 1 A diagram showing a protocol stack of digital broadcasting in an IP transmission system.

As shown in FIG. 1, a lowest layer is a physical layer. The frequency band of broadcast waves assigned for a service (channel) corresponds to this. An upper layer that is adjacent to the physical layer is an IP layer sandwiching a BBP stream (Base Band Packet Stream) therebetween. The BBP stream is a stream including packets storing various types of data of the IP transmission system.

The IP layer corresponds to an IP (Internet Protocol) in the TCP/IP protocol stack. IP packets are identified by IP addresses. An upper layer adjacent to the IP layer is a UDP layer. In a further upper layer, RTP and FLUTE/ALS are shown. Thus, in the digital broadcasting in the IP transmission system, packets in which a port number of a UDP (User Datagram Protocol) is specified are transmitted and an RTP (Real time Transport Protocol) session or a FLUTE (File Delivery over Unidirectional Transport) session is established, for example.

In an upper layer adjacent to the FLUTE/ALS, fMP4 (Fragmented MP4) is shown. In addition, in an upper layer adjacent to the RTP and the fMP4, video data (Video), audio data (Audio), and closed caption data (Closed Caption) are shown, for example. Thus, the RTP session is used when the video data and the audio data are transmitted as streams, and the FLUTE session is used when the video data and the audio data are transmitted as files.

Further, in an upper layer of the FLUTE/ALS, NRT content, ESG, and SCS are shown. The NRT content, ESG, and SCS are transmitted through the FLUTE session. The NRT content is content transmitted by NRT (Non-Real Time) broadcasting, stored in storage of a receiver, and then reproduced. Note that the NRT content is an example of the content and other content files may be transmitted through the FLUTE session. The ESG is an electronic service guide.

The SCS (Service Channel Signaling) is signaling information in units of services and transmitted through the FLUTE session. For example, USD (User Service Description), MPD (Media Presentation Description), SDP (Session Description Protocol), FDD (File Delivery Description), SPD (Service Parameter Description), and IS (Initialization Segment) are transmitted as the SCS.

LLS (Low Layer Signaling) is low-layer signaling information and transmitted in the BBP stream. For example, service configuration information items such as SCD (Service Configuration Description), EAD (Emergency Alerting Description), and RRD (Region Rating Description) are transmitted as the LLS.

(Configuration of Broadcast Wave in IP Transmission System)

Figure 2:
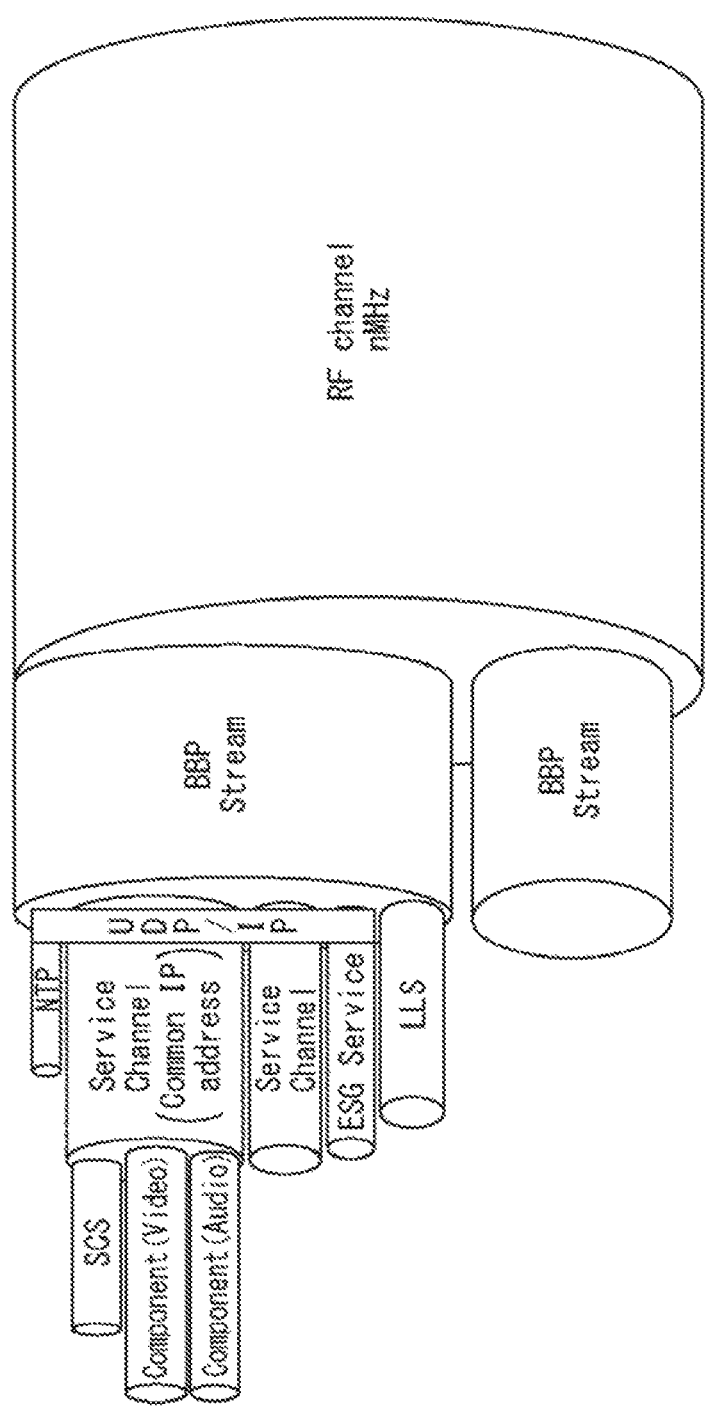
FIG. 2 A diagram showing a configuration of a broadcast wave of the digital broadcasting in the IP transmission system.

FIG. 2 is a diagram showing a configuration of a broadcast wave of the digital broadcasting in the IP transmission system.

As shown in FIG. 2, a plurality of BBP streams are transmitted in a broadcast wave (RF Channel) having a predetermined frequency band. Further, each of the BBP streams includes an NTP (Network Time Protocol), a plurality of service channels, an electronic service guide (ESG Service), and an LLS. Note that the NTP, the service channels, and the electronic service guide are transmitted according to a UDP/IP protocol while the LLS is transmitted in the BBP stream. Further, the NTP is time information and can be common to the plurality of service channels.

The service channels (hereinafter, referred to as "services") include components such as video, audio, and closed captions, which are information items configuring a program, and an SCS such as USD and SPD. A common IP address is added to the services. Using this IP address, the components, the SCS, and the like can be packaged for one or more services.

An RF channel ID (RF_channel_id) is assigned to a broadcast wave (RF Channel) having a predetermined frequency band. Further, a BBP stream ID (BBP_stream_id) is assigned to one or more BBP streams transmitted by each broadcast wave. In addition, a service ID (service_id) is assigned to one or more services transmitted by each of the BBP streams.

Such a configuration corresponding to a combination of network ID (network_id), transport stream ID (transport_stream_id), and service ID (service_id) used in the MPEG2-TS (Moving Picture Expert Group 2-Transport Stream) system (hereinafter, referred to as "triplet") is employed as the ID system of the IP transmission system. This triplet indicates a BBP stream configuration and a service configuration in a broadcasting network.

The use of this ID system can achieve compatibility with the currently widely spread MPEG2-TS system, and hence it is possible to easily perform simulcast during transition from the MPEG2-TS system to the IP transmission system, for example. It should be noted that the RF channel ID and the BBP stream ID in the ID system of the IP transmission system correspond to the network ID and the transport stream ID in the MPEG2-TS system, respectively.

<2. Solution 1>

By the way, if a hybrid service is introduced into the digital broadcasting in the IP transmission system, it is necessary to describe information relating to broadcasting and communication in signaling information. Thus, an increase in data size of the signaling information transmitted by broadcasting is assumed. Therefore, the data size is required to be reduced. In view of this, as a method for addressing this requirement, two solutions, Solution 1 and Solution 2 will be proposed in the present technology. Solution 1 will be first described.

(1) Structure of Signaling Information

Figure 3:
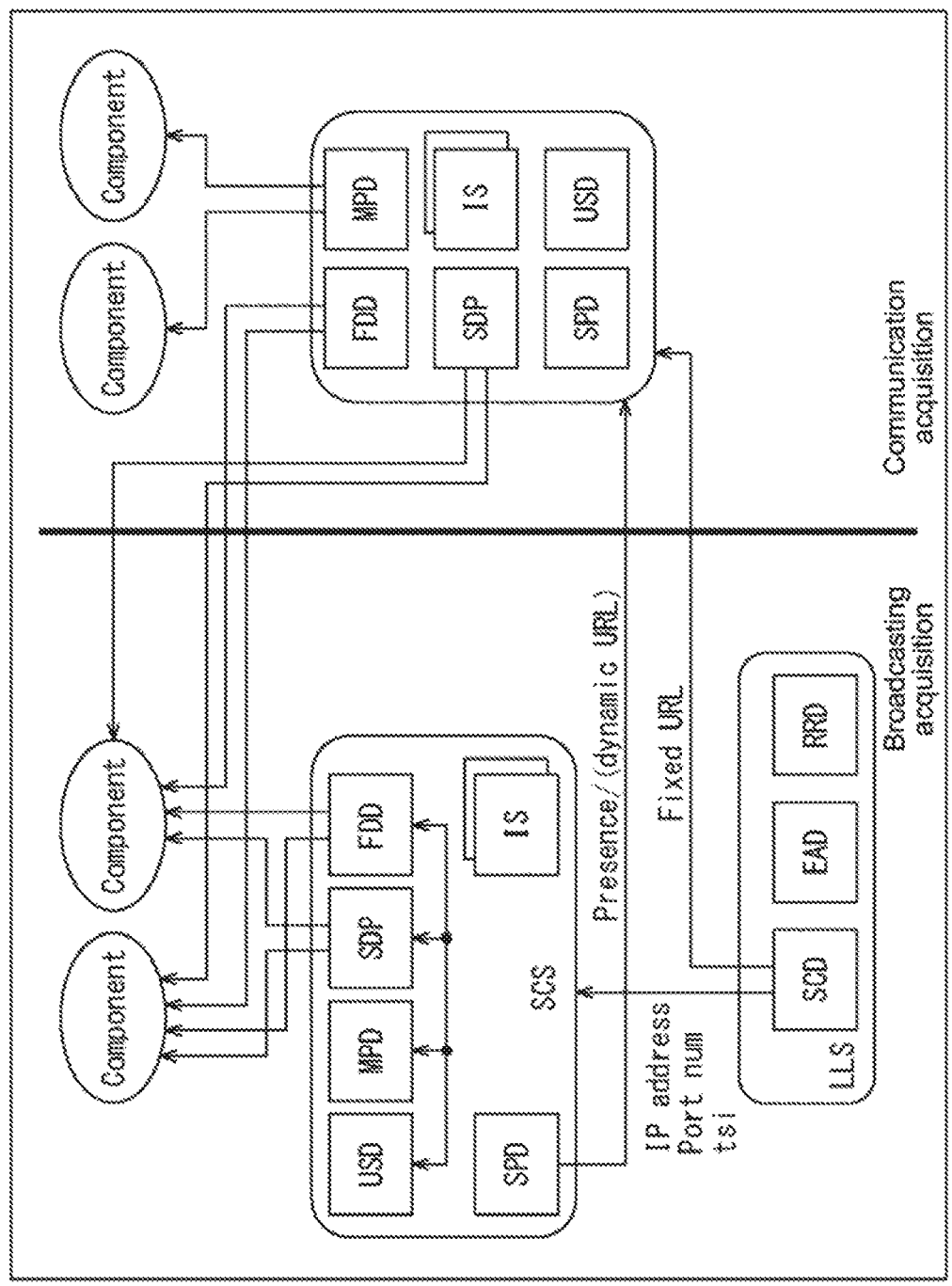
FIG. 3 A diagram showing a structure of signaling information according to Solution 1.

FIG. 3 is a diagram showing a structure of signaling information according to Solution 1. In FIG. 3, different acquisition sources for signaling information and components are in a left-hand region and a right-hand region with respect to a boundary line shown as the bold line extending in a vertical direction of the figure. The left-hand region shows "broadcasting acquisition" in which the acquisition source is broadcasting and the right-hand region shows "communication acquisition" in which the acquisition source is communication.

As the signaling information in the broadcasting acquisition in the left-hand region of the figure, LLS (Low Layer Signaling) and SCS (Service Channel Signaling) are provided. The LLS is acquired when the receiver performs initial scanning, for example. SCD, EAD, and RRD are acquired as the LLS. The SCD (Service Configuration Description) employs the triplet used in the MPEG2-TS system. This triplet indicates the BBP stream configuration and the service configuration in the broadcasting network. The SCD further includes information on an IP address and the like serving as attribute/setting information in units of services, bootstrap information for acquiring the SCS and ESG, and the like. The SCD further includes, if the signaling information is transmitted by communication, information relating to the signaling information transmitted by communication.

The EAD (Emergency Alerting Description) includes information relating to emergency notice. The RRD (Region Rating Description) includes rating information. Note that the SCD, EAD, and RRD are described with a markup language, for example, an XML (Extensible Markup Language).

The SCS is transmitted through the FLUTE session, and hence acquired according to IP address, port number, and TSI described in SCS bootstrap information of the SCD. USD, MPD, SDP, FDD, SPD, and IS are acquired as the SCS. The USD (User Service Description) includes link information for referring to the MPD, SDP, and FDD. Note that the USD is in some cases called USBD (User Service Bundle Description). The MPD (Media Presentation Description) includes information on URLs (Uniform Resource Locators) and the like for streams (components) transmitted in units of services. Note that the MPD complies with the MPEG-DASH (Moving Picture Expert Group-Dynamic Adaptive Streaming over HTTP) standard.

The SDP (Session Description Protocol) includes a service attribute in units of services, component configuration information, a component attribute, component filter information, component location information, and the like. The FDD (File Delivery Description) includes, as index information for each TSI (Transport Session Identifier), location information (e.g., URL) and information on TOI (Transport Object Identifier) and the like. Note that the FDD may be included as an element in the USD.

The SPD (Service Parameter Description) includes various parameters defined at a service level and a component level. The SPD further includes, if the signaling information is transmitted by communication, information relating to the signaling information transmitted by communication. The IS (Initialization Segment) is control information that is, if (files of) the components are segmented and transmitted as segments complying with the ISO Base Media File Format standard, transmitted together with media segments storing segment data. Note that the IS transmitted in units of components such as video and audio.

If the components such as the video and audio are transmitted as streams in units of segments by broadcasting through the FLUTE, a segment transmitted through the FLUTE session is determined by using the signaling information such as the SDP, FDD, and IS and a broadcast component is acquired.

On the other hand, the USD, MPD, SDP, FDD, SPD, and IS are acquired as the signaling information in the communication acquisition on the right-hand side of the figure. That is, the signaling information transmitted by communication has a signaling system identical to that of the SCS in the broadcasting acquisition. This signaling information is acquired according to a URL of a signaling server that is described in the SCD transmitted by broadcasting. If the signaling information is transmitted by communication, the URL of the signaling server that provides the signaling information is described in the SPD acquired by broadcasting, and hence the signaling information may be acquired according to that URL. That is, the SCD is acquired during initial scanning or the like, and hence the URL described in the SCD is a stationary URL (Fixed URL). On the other hand, the SPD is acquired during channel selection or the like, and hence it can be said that the URL described in the SPD is a dynamic URL.

Then, if the components such as the video and audio are transmitted as streams by broadcasting through the FLUTE in units of segments, a segment is determined by using the signaling information such as the SDP, FDD, and IS, and a broadcast component (Component) is acquired. If the components are, as the streams, transmitted by communication in units of segments, a segment is determined by using the signaling information such as the MPD and a communication component (Component) is acquired. Note that the files of the USD, MPD, SDP, FDD, SPD, IS, and the like acquired by communication can be handled as a single file in the ZIP file format, for example.

As described above, in the signaling information acquired by broadcasting, only the information relating to the broadcast component (stream) transmitted by broadcasting is described and the information relating to the communication component (stream) transmitted by communication is not described. Therefore, the increase in data size of signaling information transmitted by broadcasting can be suppressed. In contrast, in the signaling information acquired by communication, the information relating to the broadcast component (stream) transmitted by broadcasting and the information relating to the communication component (stream) transmitted by communication are both described. The signaling information transmitted by communication is acquired via the Internet, and hence there is less need to worry about the data size in comparison with the signaling information transmitted by broadcasting. Thus, this is not an issue.

(2) Specific Application Example

Next, a specific application example according to Solution 1 will be described. Here, a service formed of only streams transmitted by broadcasting (hereinafter, referred to as "basic service") and a service formed of streams transmitted by broadcasting and communication (hereinafter, referred to as "hybrid service") will be described in the stated order.

(2-1) Basic Service

Figure 4:
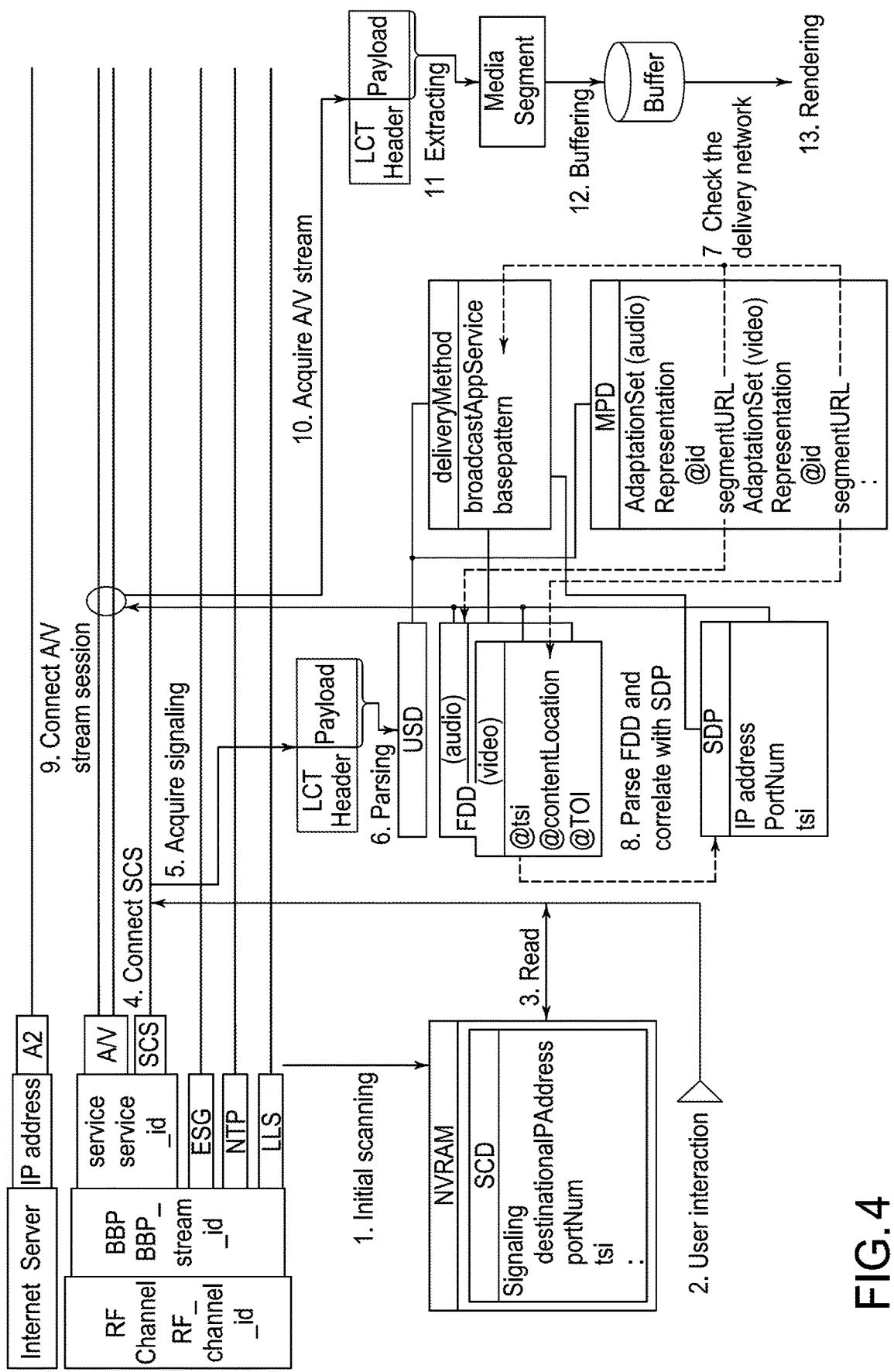
FIG. 4 A diagram explaining a channel selection scenario of a basic service according to Solution 1.

FIG. 4 is a diagram for explaining a channel selection scenario of the basic service according to Solution 1.

In FIG. 4, a transmitter of a broadcasting station (broadcaster) transmits, through a broadcast wave (RF Channel) of the digital broadcasting using the IP transmission system, components and signaling information configuring each service in a BBP stream. It should be noted that the above-mentioned ID system is employed in this digital broadcasting. Further, files of the components and signaling information are transmitted through the FLUTE session. In the basic service, only streams transmitted by broadcasting are acquired and streams and signaling information transmitted by communication from an Internet server such as a streaming server and a signaling server are not acquired.

As shown in FIG. 4, a receiver placed in each house or the like acquires an SCD transmitted in LLS by initial scanning and records it on an NVRAM (Procedure 1). This SCD includes SCS Bootstrap information in which IP address, port number, and TSI for acquiring the SCS are described. When the user selects a particular service (basic service) (Procedure 2), the receiver reads out the SCD from the NVRAM (Procedure 3), and is connected to the SCS transmitted by a broadcast wave according to the SCS Bootstrap information and acquire signaling information (Procedures 4 and 5).

The file of the SCS is being transmitted through the FLUTE session, and hence the signaling information such as the USD, MPD, SDP, and FDD is acquired by parsing data stored in LCT packets (Procedure 6). Although a delivery-Method element is considered as a child element of the USD, for the sake of description, it is shown separately from the USD in the figure. Further, link information is described in the USD and this link information is used for acquiring the MPD, SDP, and FDD. Those signaling information items are all included in the SCS, and hence all of them can also be acquired from it.

In AdaptationSet elements of the MPD, Representation elements are provided and components transmitted as streams by broadcasting or communication are enumerated. In the Representation elements, segment URLs indicating acquisition sources of the components are enumerated other than representation IDs. In the example of the MPD of FIG. 4, video and audio components are enumerated in the Representation elements within the AdaptationSet elements. Further, in the deliveryMethod element of the USD, information for identifying a delivery mode for the components is specified.

In the channel selection scenario of FIG. 4, the basic service, that is, the component is transmitted only by broadcasting, and hence a broadcastAppService element is provided in the deliveryMethod element and the URL of the component transmitted by broadcasting is specified in a basepattern element. By matching the segment URLs described in the MPD with the URL described in the deliveryMethod element, it is determined that the video and audio components enumerated in the MPD are being transmitted by broadcasting (Procedure 7).

Further, tsi attribute, contentLocation attribute, and toi attribute are described in the FDD. In the tsi attribute, a TSI (Transport Session Identifier) that is identification information of each FLUTE session are specified. Further, in the toi attribute, an TOI (Transport Object Identifier) that is identification information of a plurality of objects transmitted in each FLUTE session is specified. In the contentLocation attribute, the URL of the file is specified. By matching the segment URLs described in the MPD with the URLs described in the FDD, the TSI and TOI for acquiring the components enumerated in the MPD are determined (Procedure 8). In addition, by referring to the SPD, IP addresses and port numbers for acquiring those video and audio components are determined (Procedure 8).

In this manner, the IP address, port number, TSI, and TOI for acquiring the video component and the IP address, port number, TSI, and TOI for acquiring the audio component are acquired. Using the IP addresses, port numbers, TSIs, and TOIs for the video and audio components, the receiver is connected to the video and audio streams being transmitted through the FLUTE session, and acquires the LCT packets (Procedures 9 and 10). Then, the receiver extracts segment data (media segment) stored in the LCT packets and temporarily stores it in a buffer for buffering (Procedures 11 and 12), and performs rendering (Procedure 13). With this, at the receiver, a picture of a program corresponding to the particular service (basic service) selected by the user is displayed and at the same time sound synchronized with that picture is output.

As described above, in the basic service, the video and audio components (streams) are delivered only by broadcasting, and hence the information relating to those components is described in the signaling information (SCS) transmitted by broadcasting. Therefore, the receiver acquires the video and audio components (streams) on the basis of the signaling information transmitted by broadcasting. At this time, only the information relating to the components being transmitted by broadcasting is described in this signaling information, and hence the increase in data size can be suppressed. Note that the receiver not adapted for the hybrid service basically cannot be connected to the Internet, and hence cannot acquire the signaling information transmitted by communication. Even such a receiver can acquire the signaling information transmitted by broadcasting, and hence it is possible to view the program of the basic service.

(2-2) Hybrid Service

Figure 5:
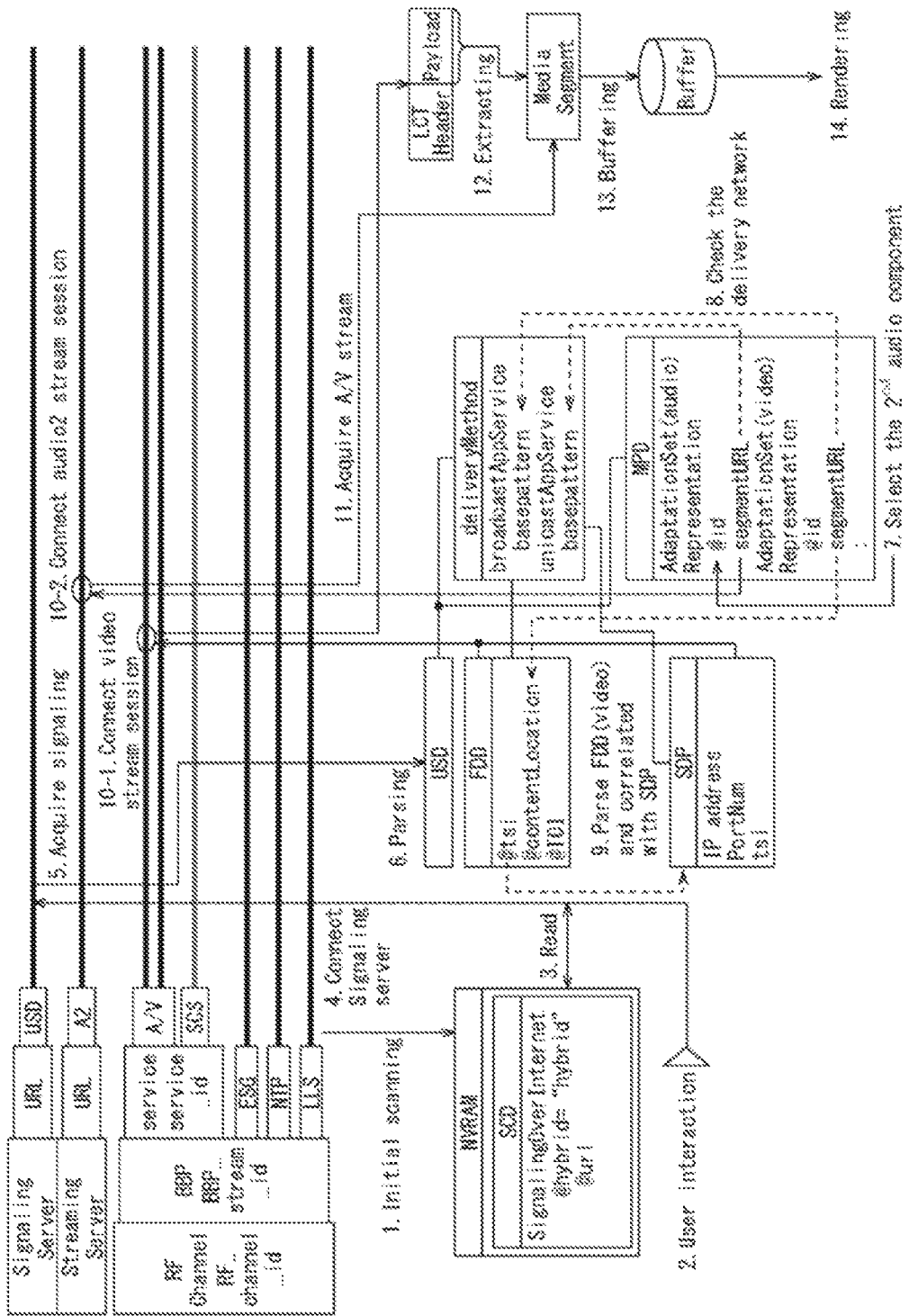
FIG. 5 A diagram explaining a channel selection scenario of a hybrid service according to Solution 1.

FIG. 5 is a diagram for explaining a channel selection scenario of a hybrid service according to Solution 1.

In FIG. 5, as in FIG. 4, the transmitter of the broadcasting station is transmitting, through a broadcast wave of the digital broadcasting using the IP transmission system, components and signaling information configuring each service in a BBP stream. Further, in the hybrid service, at the receiver, streams transmitted by communication are also acquired, and hence a stream of audio (A2: Audio2) is transmitted from the streaming server. Further, signaling information (e.g., ZIP file of USD) is transmitted from the signaling server.

As shown in FIG. 5, a receiver placed in each house or the like acquires an SCD transmitted in LLS by initial scanning and records it on an NVRAM (Procedure 1). In this SCD, a SignalingOverinternet element, and a hybrid attribute and an url attribute as descendants thereof are described. In the hybrid attribute, "basic" is specified in the case of the basic service and "hybrid" is specified in the case of the hybrid service. Therefore, "hybrid" is specified here. In the url attribute, a URL of a signaling server, for example, is specified as an acquisition source of the signaling information.

Note that the initial scanning is performed at the start of the use of the receiver, for example. Thus, it is not frequently performed. Therefore, even if, at the receiver adapted for the hybrid service, "hybrid" is specified as the hybrid attribute in the SignalingOverinternet element of the SCD acquired in the initial scanning, it is assumed that the streams of the basic service are received. That is, when "hybrid" is specified in this hybrid attribute, it can be said that it indicates that streams of the hybrid service may be received.

When the user selects a particular service (hybrid service) (Procedure 2), the receiver reads out the SCD from the NVRAM (Procedure 3), and accesses the signaling server via the Internet according to the URL specified as the url attribute of the SignalingOverinternet element, such that the signaling information such as the USD, MPD, SDP, and FDD is acquired (Procedures 4, 5, and 6).

In the example of the MPD of FIG. 5, video and audio components are enumerated in the Representation elements within the AdaptationSet elements. Further, in the channel selection scenario of FIG. 5, the hybrid service, that is, the component is transmitted by broadcasting and communication, and hence a broadcastAppService element and a unicastAppService element are provided in a deliveryMethod element of the USD. In a basepattern element of the broadcastAppService element, a URL of a component transmitted by broadcasting is specified. In a basepattern element of the unicastAppService element, a URL of a component transmitted by communication is specified.

By matching the segment URLs described in the MPD with the URLs described in the deliveryMethod element of the USD, it is determined that, out of the components enumerated in the MPD, the video component is being transmitted by broadcasting and the audio component is being transmitted by communication (Procedure 8). Further, by matching the segment URLs described in the MPD with the URLs described in the FDD, the TSI and TOI for acquiring the video component transmitted by broadcasting are determined (Procedure 9). In addition, by referring to the SPD, the IP address and port number for acquiring the video component are determined (Procedure 9). Note that the audio component is transmitted by communication, and hence the segment URL of the MPD corresponding to this audio component is the URL of the streaming server delivering the component (stream) of the audio (A2: Audio2).

In this manner, the IP address, port number, TSI, and TOI for acquiring the video component and the URL of the streaming server for acquiring the audio component are acquired. Using the IP address, port number, TSI, and TOI of the video component, the receiver is connected to the video stream being transmitted through the FLUTE session, and acquires LCT packets (Procedure 10-1). Then, the receiver extracts segment data (media segment) stored in the LCT packets (Procedure 12). Further, the receiver accesses the streaming server via the Internet according to the segment URL of the MPD, and is connected to the audio stream (Procedure 10-2).

As a result, the video and audio streams are acquired (Procedure 11), and hence the receiver temporarily stores data of them in a buffer for buffering (Procedure 13), and performs rendering (Procedure 14). With this, at the receiver, a picture of a program corresponding to the particular service (hybrid service) selected by the user is displayed and at the same time sound synchronized with that picture is output.

As described above, in the hybrid service, the video and audio components (streams) are delivered by broadcasting and communication, and hence the information relating to those components is described in the signaling information transmitted by communication. Therefore, the receiver acquires the video and audio components (streams) on the basis of the signaling information transmitted by communication. At this time, in this signaling information, the information items relating to the components transmitted by broadcasting and communication are both described. However, in the case of the signaling information transmitted by communication, there is less need to worry about the data size in comparison with the signaling information transmitted by broadcasting. Thus, this is not an issue. Note that the receiver adapted for the hybrid service can be connected to the Internet as a premise, and hence even if the signaling information is transmitted by communication, this is not an issue.

<3. Solution 2>

Next, Solution 2 will be described. In Solution 2, the signaling information acquired by broadcasting is simplified in comparison with Solution 1 described above.

(1) Structure of Signaling Information

Figure 6:
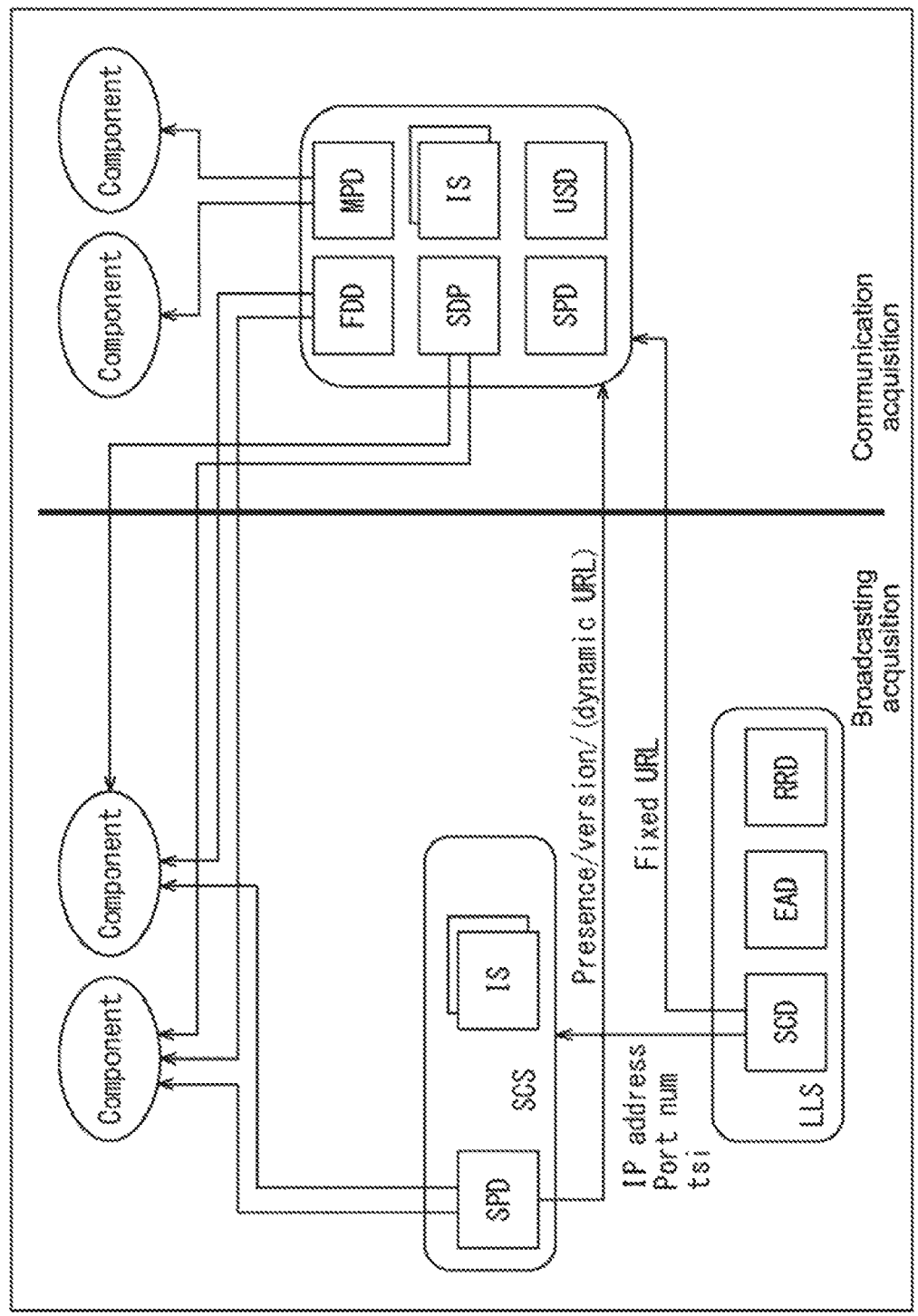
FIG. 6 A diagram showing a structure of signaling information according to Solution 2.

FIG. 6 is a diagram showing a structure of signaling information according to Solution 2. In FIG. 6, as in FIG. 3, the left-hand region shows the "broadcasting acquisition" and the right-hand region shows the "communication acquisition." Further, out of the signaling information in broadcasting acquisition in the left-hand region of the figure, the LLS is the same as that in FIG. 3 and the SCS is simplified in comparison with FIG. 3. That is, in FIG. 6, the SPD and the IS are acquired as the SCS.

Here, the SPD includes various parameters defined at the service level and the component level. As this parameter at the component level, information (e.g., port number, TSI, and TOI) for acquiring the component transmitted by broadcasting is described. Thus, a segment transmitted through the FLUTE session is determined and a broadcast component (Component) is acquired.

On the other hand, as the signaling information in the communication acquisition on the right-hand side of the figure, the USD, MPD, SDP, FDD, SPD, and IS are acquired as in FIG. 3. Then, by using the signaling information such as the SDP, FDD, and IS, a segment transmitted through the FLUTE session is determined and a broadcast component (Component) is acquired. Further, by using the signaling information such as the MPD, a segment is determined and a communication component (Component) is acquired.

As described above, information items for acquiring the broadcast components (streams) transmitted by broadcasting are collected in the SPD, and hence the signaling information can be simplified without using the USD, MPD, SDP, and FDD. Further, in the structure of the signaling information according to Solution 2, as in Solution 1, in the signaling information acquired by the broadcasting, only the information relating to the broadcast component (stream) transmitted by broadcasting is described and the information relating to the communication component transmitted by communication (stream) is not described, and hence it is possible to suppress the increase in data size of signaling information transmitted by broadcasting.

(2) Specific Application Example

Next, a specific application example according to Solution 2 will be described, and, as in Solution 1 described above, channel selection scenarios in the basic service and the hybrid service will be described.

(2-1) Basic Service

Figure 7:
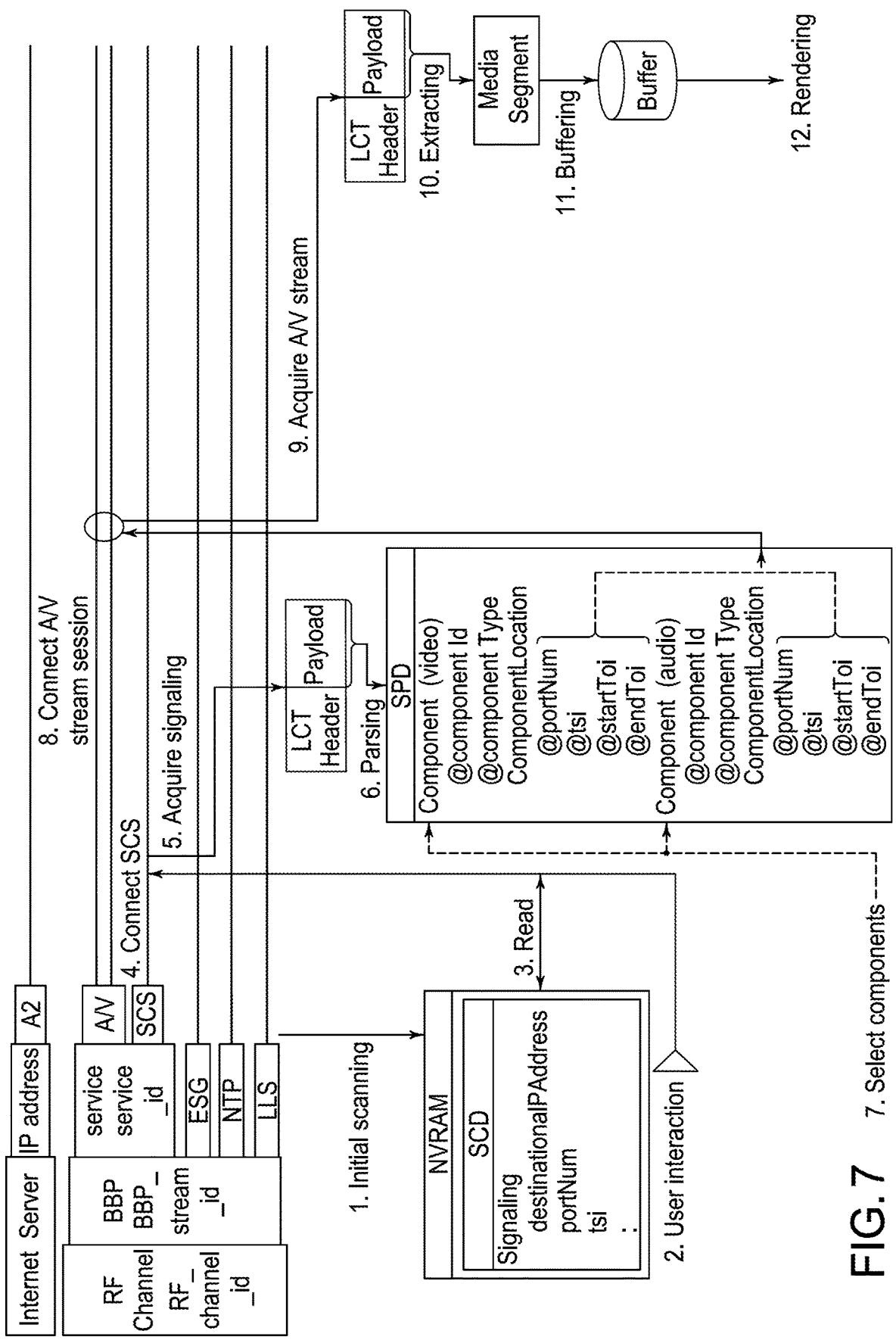
FIG. 7 A diagram explaining a channel selection scenario of a basic service according to Solution 2.

FIG. 7 is a diagram for explaining a channel selection scenario of a basic service according to Solution 2.

In FIG. 7, as in FIG. 4, the transmitter of the broadcasting station is transmitting, through a broadcast wave of the digital broadcasting using the IP transmission system, components and signaling information configuring each service in a BBP stream. Further, in the basic service, streams transmitted by broadcasting are only acquired and streams and signaling information transmitted by communication from the Internet server are not acquired.

As shown in FIG. 7, a receiver placed in each house or the like acquires an SCD transmitted in LLS by initial scanning and records it on an NVRAM (Procedure 1). This SCD includes SCS Bootstrap information in which IP address, port number, and TSI for acquiring the SCS are described. When the user selects a particular service (basic service) (Procedure 2), the receiver reads out the SCD from the NVRAM (Procedure 3), and is connected to the SCS transmitted by a broadcast wave according to the SCS Bootstrap information and acquire the signaling information (Procedures 4 and 5).

The file of the SCS is being transmitted through the FLUTE session, and hence the signaling information such as the SPD is acquired by parsing data stored in LCT packets (Procedure 6). Here, in the SPD, componentId attribute, componentType attribute, and ComponentLocation element are described as the parameters at the level of the components such as the video and audio. In the componentId attribute, a component ID is specified. In the componentType attribute, type information of the component is specified.

Further, in the ComponentLocation element, portNum attribute, tsi attribute, startToi attribute, and endToi attribute are described as location information for each component. That is, port number, TSI, and TOI are specified as information for acquiring the components (streams) transmitted by broadcasting. Note that, in the startToi attribute, a start value of the TOI if the TOI changes in time series is specified. Further, in the endToi attribute, an end value of the TOI if the TOI changes in time series is specified. That is, by specifying the startToi attribute and the endToi attribute, that value is sequentially incremented from the start value to the end value of the TOI.

In this manner, the IP address, port number, TSI, and TOI for acquiring the video component and the IP address, port number, TSI, and TOI for acquiring the audio component are acquired (Procedure 7). Using the IP addresses, port numbers, TSIs, and TOIs for the video and audio components, the receiver is connected to the stream being transmitted through the FLUTE session, and acquires the LCT packets (Procedures 8 and 9). Then, the receiver extracts segment data (media segment) stored in the LCT packets and temporarily stores it in a buffer for buffering (Procedures 10 and 11), and performs rendering (Procedure 12). With this, at the receiver, a picture of a program corresponding to the particular service (basic service) selected by the user is displayed and at the same time sound synchronized with that picture is output.

As described above, in the basic service, the video and audio components (streams) are delivered only by broadcasting, and hence the information relating to those components is described in the signaling information (SCS) transmitted by broadcasting. Therefore, the receiver acquires the video and audio components (streams) on the basis of the signaling information transmitted by broadcasting. At this time, only the information relating to the components being transmitted by broadcasting is described in this signaling information, and hence the increase in data size can be suppressed.

(2-2) Hybrid Service

Figure 8:
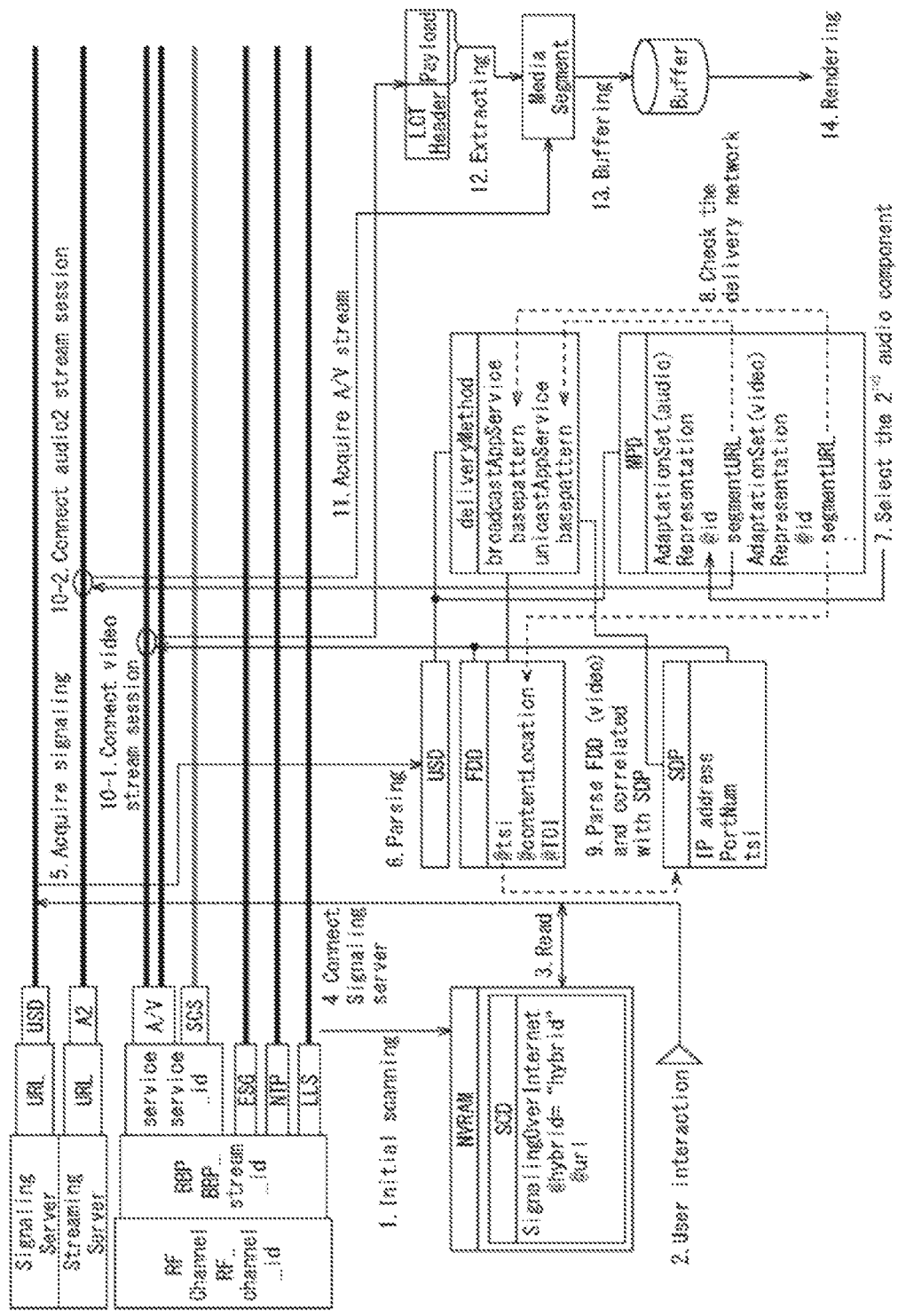
FIG. 8 A diagram explaining a channel selection scenario of a hybrid service according to Solution 2.

FIG. 8 is a diagram for explaining a channel selection scenario of a hybrid service according to Solution 2.

In FIG. 8, as in FIG. 4, the transmitter of the broadcasting station is transmitting, through a broadcast wave of the digital broadcasting using the IP transmission system, components and signaling information configuring each service in a BBP stream. Further, in the hybrid service, at the receiver, streams transmitted by communication are also acquired, and hence a stream of audio (A2: Audio2) is transmitted from the streaming server. Further, signaling information (e.g., ZIP file including USD and the like) is being transmitted from the signaling server.

As shown in FIG. 8, a receiver placed in each house or the like acquires an SCD transmitted in LLS by initial scanning, and records it on an NVRAM (Procedure 1). In this SCD, a SignalingOverinternet element, and a hybrid attribute and an url attribute as descendants thereof are described. In the hybrid attribute, "hybrid" is specified. Further, the URL of the signaling server, for example, is specified in the url attribute. Note that, as described above, even when "hybrid" is specified as the hybrid attribute in the SignalingOverinternet element, it is assumed that the streams of the basic service are received. Therefore, when "hybrid" is specified in this hybrid attribute, it can be said that it indicates that streams of the hybrid service may be received.

When the user selects a particular service (hybrid service) (Procedure 2), the receiver reads out the SCD from the NVRAM (Procedure 3), and accesses the signaling server via the Internet according to the URL specified as the url attribute of the SignalingOverinternet element, and accesses the signaling server via the Internet, such that the signaling information such as the USD, MPD, SDP, and FDD is acquired (Procedures 4, 5, and 6).

In the example of the MPD of FIG. 8, video and audio components are enumerated in the Representation elements within the AdaptationSet elements. Further, in the channel selection scenario of FIG. 8, the hybrid service, that is, the component is transmitted by broadcasting and communication, and hence the broadcastAppService element and the unicastAppService element are provided in the deliveryMethod element of the USD.

Then, by matching the segment URLs described in the MPD with the URLs described in the deliveryMethod element of the USD, it is determined that, out of the components enumerated in the MPD, the video component is being transmitted by broadcasting and the audio component is being transmitted by communication (Procedure 8). Further, by matching the segment URLs described in the MPD with the URLs described in the FDD, the TSI and TOI for acquiring the video component transmitted by broadcasting are determined (Procedure 9).

In addition, by referring to the SPD, the IP address and port number for acquiring the video component are determined (Procedure 9). Note that the audio component is transmitted by communication, and hence the segment URL of the MPD corresponding to this audio component is the URL of the streaming server delivering the component (stream) of the audio (A2: Audio2).

In this manner, the IP address, port number, TSI, and TOI for acquiring the video component and the URL of the streaming server for acquiring the audio component are acquired. Using the IP address, port number, TSI, and TOI of the video component, the receiver is connected to the video stream being transmitted through the FLUTE session, and acquires LCT packets (Procedure 10-1). Then, the receiver extracts segment data (media segment) stored in the LCT packets (Procedure 12). Further, the receiver accesses the streaming server via the Internet according to the segment URL of the MPD, and is connected to the audio stream (Procedure 10-2).

As a result, the video and audio streams are acquired (Procedure 11), and hence the receiver temporarily stores data of them in a buffer for buffering (Procedure 13), and performs rendering (Procedure 14). With this, in the receiver, a picture of a program corresponding to the particular service (hybrid service) selected by the user is displayed and at the same time sound synchronized with that picture is output.

As described above, in the hybrid service, the video and audio components (streams) are delivered by broadcasting and communication, and hence the information relating to those components is described in the signaling information transmitted by communication. Therefore, the receiver acquires the video and audio components (streams) on the basis of the signaling information transmitted by communication. At this time, in this signaling information, the information items relating to the components transmitted by broadcasting and communication are both described. In the case of the signaling information transmitted by communication, there is less need to worry about the data size in comparison with the signaling information transmitted by broadcasting. Thus, this is not an issue.

<4. Solutions 1 and 2>

By the way, at the receiver, the selected particular service is continued in the hybrid service. However, when the program is changed, for example, a case where a transition from the basic service to the hybrid service is made, a case where a transition from the hybrid service to the basic service is made, and the like are conceivable other than a case where the acquisition source of streams is changed. Hereinafter, those cases will be described. It should be noted that the following descriptions are common to Solution 1 and Solution 2, and hence descriptions of the both solutions will be made together, not separately.

(1) Structure of Signaling Information

As the structure of the signaling information, either one structure of the structure of the signaling information according to Solution 1 (FIG. 3) and the structure of the signaling information according to Solution 2 (FIG. 6) is used.

Figure 9:
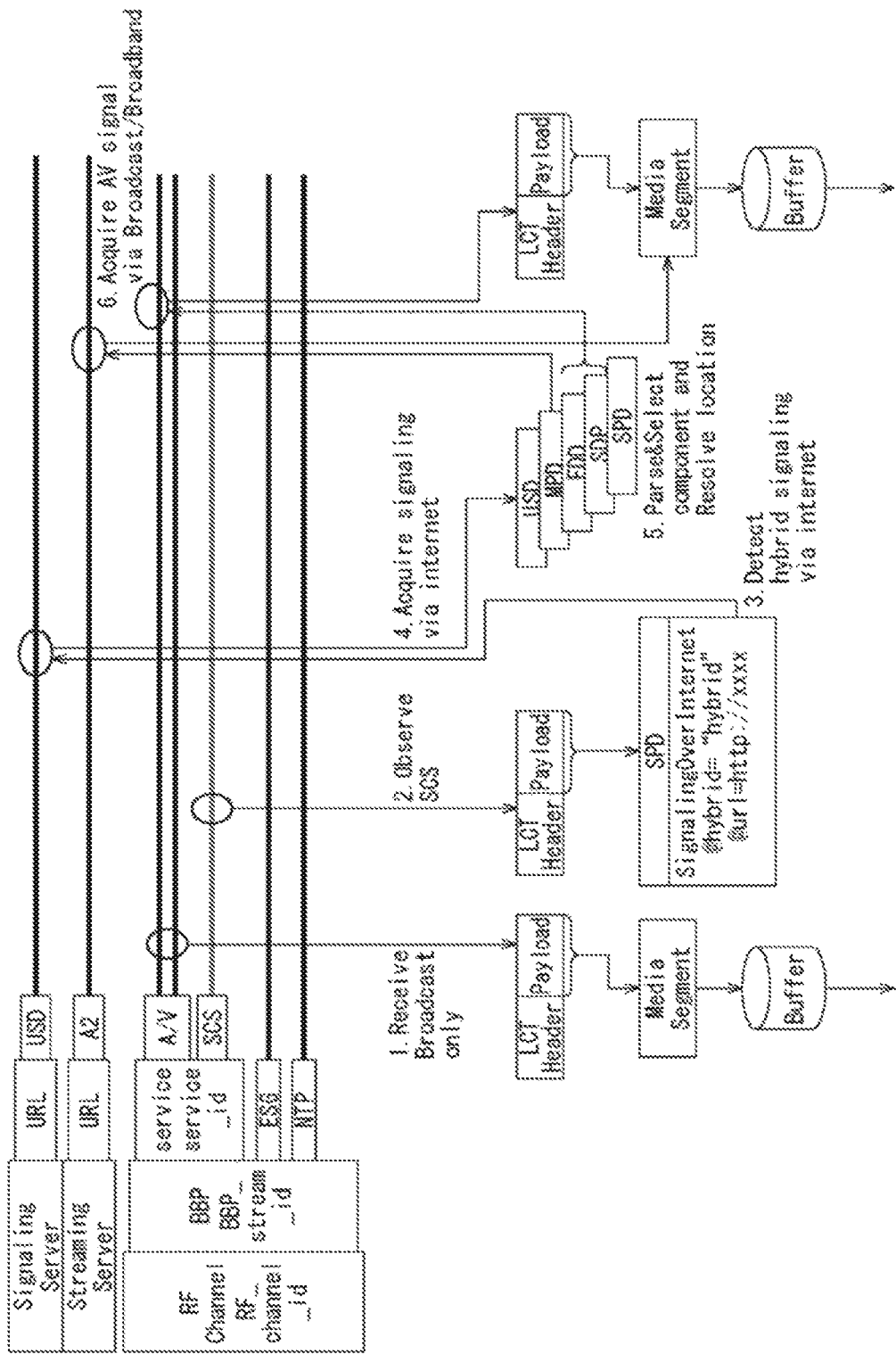
FIG. 9 A diagram for explaining a scenario in the case where a transition from the basic service to the hybrid service is made.

(2) Specific Application Example (2-1) Transition from Basic Service to Hybrid Service FIG. 9 is a diagram for explaining a scenario in the case where a transition from the basic service to the hybrid service is made.

In FIG. 9, as in FIG. 4, the transmitter of the broadcasting station is transmitting, through a broadcast wave of the digital broadcasting using the IP transmission system, components and signaling information configuring each service in a BBP stream. Further, in the hybrid service, at the receiver, streams transmitted by communication are also acquired, and hence a stream of audio (A2: Audio2) is being transmitted from the streaming server. Further, the signaling information is being transmitted from the signaling server.

As shown in FIG. 9, at the receiver placed in each house or the like, the particular service selected by the user is a basic service, and hence video and audio streams transmitted by broadcasting are acquired by using signaling information transmitted by broadcasting. With this, at the receiver, a picture of a program corresponding to the basic service is displayed and at the same time sound synchronized with that picture is output (Procedure 1). Note that this Procedure 1 corresponds to, in the case of Solution 1, the procedures in the channel selection scenario of FIG. 4 and corresponds to, in the case of Solution 2, the procedures in the channel selection scenario of FIG. 7.

At the receiver, the signaling information (SCS) transmitted by broadcasting is acquired according to the SCS Bootstrap information of the SCD, and the contents of the SignalingOverinternet element described in the SPD are constantly monitored (Procedure 2). Here, in the SignalingOverinternet element, the hybrid attribute and url attribute are described as the descendants thereof. In the hybrid attribute, "basic" is specified in the case of the basic service and "hybrid" is specified in the case of the hybrid service. In the url attribute, the URL of the signaling server, for example, is specified as the acquisition source of the signaling information.

That is, if the service selected by the user is a basic service, "basic" is specified in the hybrid attribute. However, if this service is transitioned from the basic service to the hybrid service, the value of the hybrid attribute of the SignalingOverinternet element is changed from "basic" to "hybrid." In this case, the receiver accesses the signaling server via the Internet according to the URL specified as the url attribute of the SignalingOverinternet element and acquires the signaling information (Procedures 3 and 4).

Then, at the receiver, the video component transmitted by broadcasting and the audio component transmitted by communication are acquired by using the signaling information transmitted by communication. With this, at the receiver, a picture of a program corresponding to the hybrid service is displayed and at the same time sound synchronized with that picture is output (Procedures 5 and 6). Note that Procedures 4 to 6 corresponds to, in the case of Solution 1, the procedures in the channel selection scenario of FIG. 5 and corresponds to, in the case of Solution 2, the procedures in the channel selection scenario of FIG. 8.

As described above, in the case where a transition from the basic service to the hybrid service is made, in the basic service after transition, the video and audio components are delivered only by broadcasting, and hence the information relating to those components is being described in the signaling information (SCS) transmitted by broadcasting. Therefore, the receiver acquires the video and audio components (streams) on the basis of the signaling information transmitted by broadcasting. At this time, only the information relating to the components being transmitted by broadcasting is described in this signaling information, and hence the increase in data size can be suppressed.

On the other hand, in the hybrid service after transition, the video and audio components are being delivered by broadcasting and communication, and hence the information relating to those streams is described in the signaling information transmitted by communication. Therefore, the receiver acquires the video and audio components (streams) on the basis of the signaling information transmitted by communication. At this time, in this signaling information, the information items relating to the components transmitted by broadcasting and communication are both described. In the case of the signaling information transmitted by communication, there is less need to worry about the data size in comparison with the signaling information transmitted by broadcasting. Thus, this is not an issue. By the way, even in the case where the transition is made to the hybrid service, if the user wishes to view the basic service, the receiver corresponds only to the basic service, or the receiver is not connected to the Internet, the reception of the basic service is still continued without referring to the SignalingOverinternet element.

(2-2) Change of Stream Acquisition Source in Hybrid Service

Figure 10:
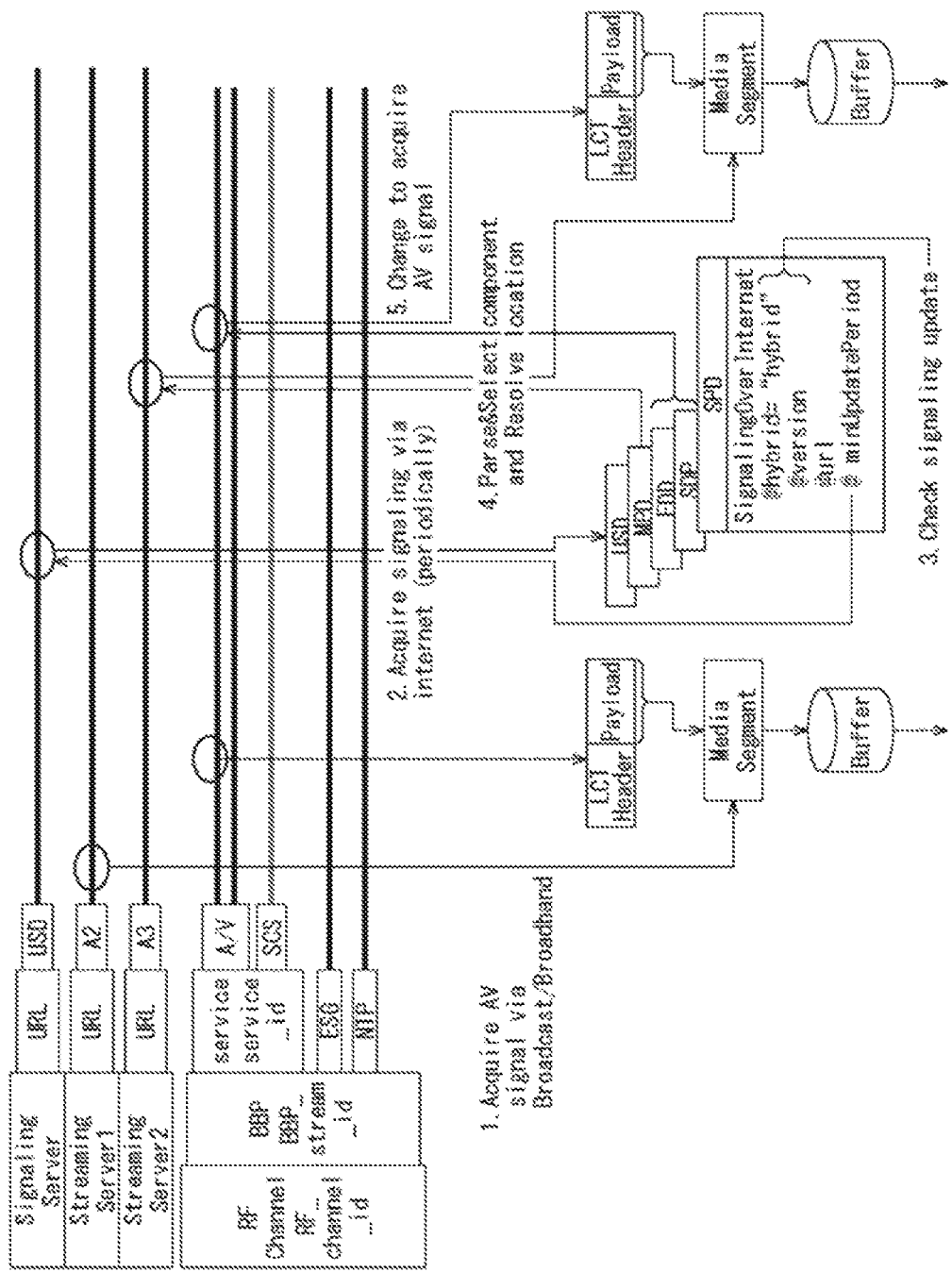
FIG. 10 A diagram for explaining a scenario in the case where an acquisition source of streams is changed in the hybrid service.

FIG. 10 is a diagram for explaining a scenario in the case where the acquisition source of the streams is changed in the hybrid service.

In FIG. 10, as in FIG. 4, the transmitter of the broadcasting station is transmitting, through a broadcast wave of the digital broadcasting using the IP transmission system, components and signaling information configuring each service in a BBP stream. Further, in the hybrid service, at the receiver, streams transmitted by communication are also acquired, and hence an audio stream is being transmitted from the streaming server. It should be noted that, in this hybrid service, different types of audio of programs are provided, and hence there are provided a streaming server (Streaming Server1) that provides audio 2 (A2) and a streaming server (Streaming Server2) that provides audio 3 (A3). Further, signaling information (e.g., ZIP file including USD and the like) is being transmitted from the signaling server.

As shown in FIG. 10, at the receiver placed in each house or the like, using the signaling information transmitted by communication, a video component transmitted by broadcasting and an audio-2 component transmitted by communication from the streaming server (Streaming Server1) are acquired. With this, at the receiver, a picture of a program corresponding to the hybrid service is displayed and at the same time sound corresponding to the audio 2 synchronized with that picture is output (Procedure 1). Note that this Procedure 1 corresponds to, in the case of Solution 1, the procedures in the channel selection scenario of FIG. 5 and corresponds to, in the case of Solution 2, the procedures in the channel selection scenario of FIG. 8.

Further, in the SignalingOverinternet element of the SPD in the signaling information transmitted by communication, version attribute and minUpdatePeriod attribute are described other than the hybrid attribute and url attribute. In the version attribute, version information of the signaling information is specified. In the minUpdatePeriod attribute, an update interval of the signaling information is specified. Therefore, the receiver accesses the signaling server at the update interval of the signaling information according to the URL of the signaling server, and acquires the signaling information (Procedure 2). Then, the receiver checks the attribute values of the hybrid attribute and version attribute of the SPD, to thereby check whether or not the contents of the signaling information have been updated (Procedure 3).

In the scenario of FIG. 10, at a timing when the program of the hybrid service is changed, the contents of the signaling information are updated and the audio is changed from the audio 2 to the audio 3. Therefore, at the receiver, using the updated signaling information, a video component transmitted by broadcasting and a component of the audio 3 transmitted by communication from the streaming server (Streaming Server2) are acquired (Procedures 4 and 5). With this, at the receiver, a picture of a program corresponding to the hybrid service is displayed and at the same time sound corresponding to the audio 3 synchronized with that picture is output. Note that those Procedures 4 and 5 correspond to, in the case of Solution 1, the procedures in the channel selection scenario of FIG. 5 and correspond to, in the case of Solution 2, the procedures in the channel selection scenario of FIG. 8.

Figure 11:
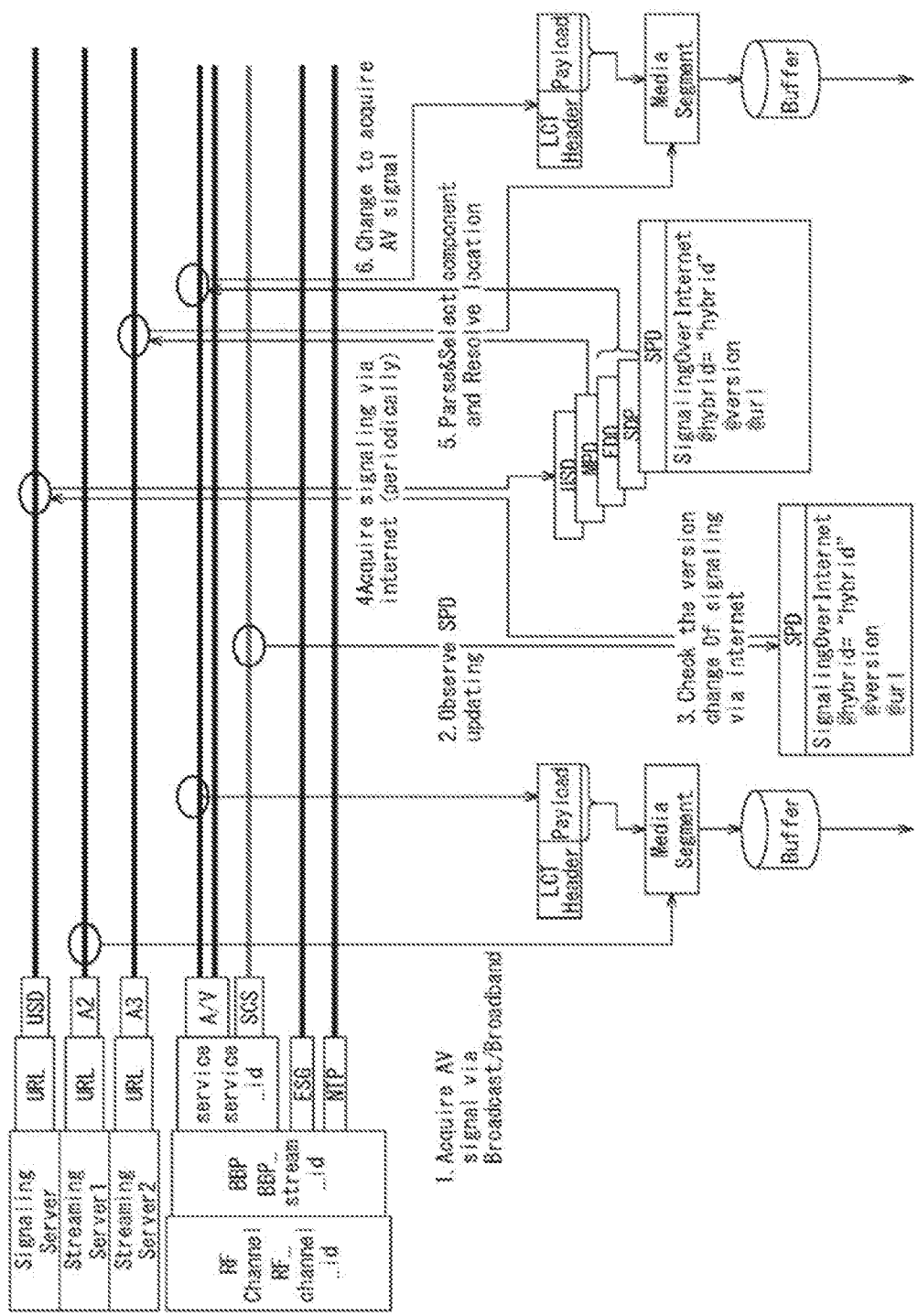
FIG. 11 A diagram for explaining another scenario in the case where the acquisition source of the streams is changed in the hybrid service.

FIG. 11 is a diagram for explaining another scenario in the case where the acquisition source of the streams is changed in the hybrid service.

FIG. 11 shows, as in FIG. 10, a scenario in the case where the acquisition source of the streams is changed in the hybrid service. They are different from each other in that the update of the signaling information is checked using the signaling information transmitted by communication in FIG. 10 while the update of the signaling information is checked using the signaling information transmitted by broadcasting in FIG. 11.

Specifically, as shown in FIG. 11, at the receiver placed in each house or the like, using the signaling information transmitted by communication, a video component transmitted by broadcasting and an audio-2 component transmitted by communication from the streaming server (Streaming Server1) are acquired. With this, at the receiver, a picture of a program corresponding to the hybrid service is displayed and at the same time sound corresponding to the audio 2 synchronized with that picture is output (Procedure 1). Note that this Procedure 1 corresponds to, in the case of Solution 1, the procedures in the channel selection scenario of FIG. 5 and corresponds to, in the case of Solution 2, the procedures in the channel selection scenario of FIG. 8.

The receiver is capable of acquiring the signaling information (SCS) transmitted by broadcasting according to the SCS Bootstrap information of the SCD, and the contents of the SignalingOverinternet element described in the SPD are constantly monitored (Procedure 2). Then, the receiver checks the attribute values of the hybrid attribute and version attribute of the SPD, to thereby check whether or not the contents of the signaling information transmitted by communication have been updated (Procedure 3). If the signaling information transmitted by communication has been updated, the receiver accesses the signaling server according to the URL of the signaling server, and acquires the updated signaling information (Procedure 4).

In the scenario of FIG. 11, as in the scenario of FIG. 10, at a timing when the program of the hybrid service is changed, the contents of the signaling information are updated and the audio is changed from the audio 2 to the audio 3, and hence, at the receiver, a video component transmitted by broadcasting and a component of the audio 3 transmitted by communication from the streaming server (Streaming Server2) are acquired by using the updated signaling information (Procedures 5 and 6). With this, at the receiver, a picture of a program corresponding to the hybrid service is displayed and at the same time sound corresponding to the audio 3 synchronized with that picture is output. Note that those Procedures 5 and 6 correspond to, in the case of Solution 1, the procedures in the channel selection scenario of FIG. 5 and correspond to, in the case of Solution 2, the procedures in the channel selection scenario of FIG. 8.

As described above, in the case where the acquisition source of the streams is changed in the hybrid service, the video and audio components (streams) are delivered by broadcasting and communication, and hence the information relating to those components is described in the signaling information transmitted by communication. Therefore, the receiver acquires the video and audio components (streams) on the basis of the signaling information transmitted by communication. At this time, in this signaling information, the information items relating to the components transmitted by broadcasting and communication are both described. In the case of the signaling information transmitted by communication, there is less need to worry about the data size in comparison with the signaling information transmitted by broadcasting. Thus, this is not an issue.

(2-3) Transition from Hybrid Service to Basic Service

Figure 12:
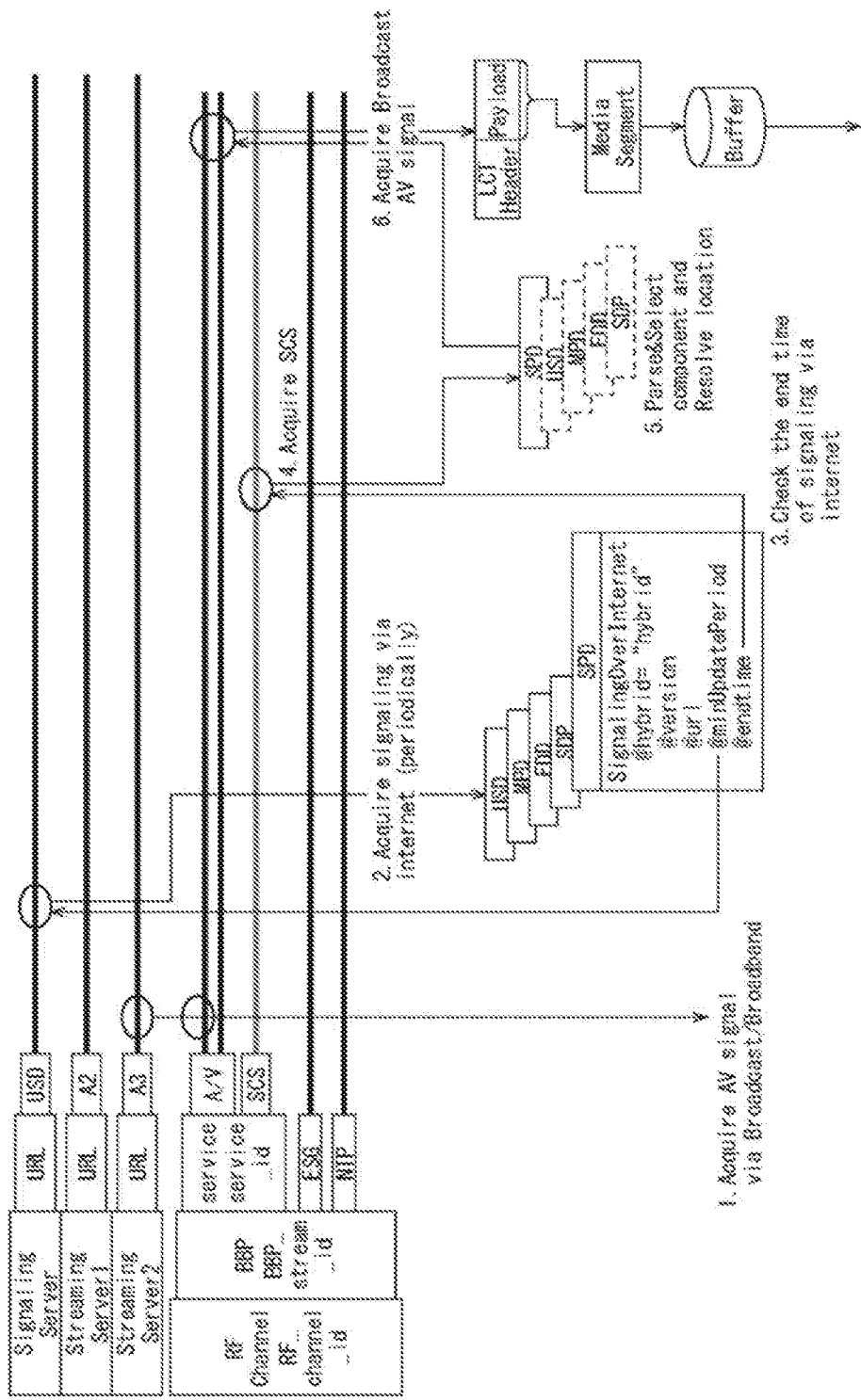
FIG. 12 A diagram for explaining a scenario in the case where a transition from the hybrid service to the basic service is made.

FIG. 12 is a diagram for explaining a scenario in the case where a transition from the hybrid service to the basic service is made.

In FIG. 12, as in FIG. 4, the transmitter of the broadcasting station is transmitting, through a broadcast wave of the digital broadcasting using the IP transmission system, components and signaling information configuring each service in a BBP stream. Further, in the hybrid service, at the receiver, streams transmitted by communication are also acquired, and hence an audio stream is being transmitted from the streaming server. It should be noted that, in this hybrid service, audio (A2) and audio 3 (A3) are provided, and hence a plurality of streaming servers (Streaming Servers 1 and 2) are provided. Further, signaling information (e.g., ZIP file including USD and the like) is being transmitted from the signaling server.

As shown in FIG. 12, at the receiver placed in each house or the like, the particular service selected by the user is a hybrid service, and hence a video component transmitted by broadcasting and a component of the audio 3 transmitted by communication from the streaming server (Streaming Server2) is acquired by using the signaling information transmitted by communication. With this, at the receiver, a picture of a program corresponding to the hybrid service is displayed and at the same time sound corresponding to the audio 3 synchronized with that picture is output (Procedure 1). Note that this Procedure 1 corresponds to, in the case of Solution 1, the procedures in the channel selection scenario of FIG. 5 and corresponds to, in the case of Solution 2, the procedures in the channel selection scenario of FIG. 8.

Further, in the signaling information transmitted by communication, other than the hybrid attribute, the version attribute, and the url attribute, the minUpdatePeriod attribute and the endtime attribute are described in the SignalingOverinternet element of the SPD. In the minUpdatePeriod attribute, an update interval of the signaling information is specified. In the endtime attribute, the point of time of the end of the communication acquisition of the signaling information is specified. Therefore, the receiver accesses the signaling server at the update interval of the signaling information according to the URL of the signaling server, and acquires the signaling information (Procedure 2). Then, the receiver checks the attribute value of the endtime attribute of the SPD, to thereby check whether or not to terminate the communication acquisition of the signaling information (Procedure 3).

When the communication acquisition of the signaling information is terminated, at the receiver, the signaling information (SCS) transmitted by broadcasting is acquired according to the SCS Bootstrap information of the SCD (Procedure 4). That is, the signaling information is changed from the communication acquisition to the broadcasting acquisition and a transition from the hybrid service to the basic service is made.

Then, at the receiver, using signaling information (SCS) transmitted by broadcasting, the video and audio components transmitted by broadcasting are acquired (Procedures 5 and 6). With this, at the receiver, a picture of a program corresponding to the basic service is displayed and at the same time sound synchronized with that picture is output. Note that those Procedures 5 and 6 correspond to, in the case of Solution 1, the procedures in the channel selection scenario of FIG. 4 and correspond to, in the case of Solution 2, the procedures in the channel selection scenario of FIG. 7.

Figure 13:
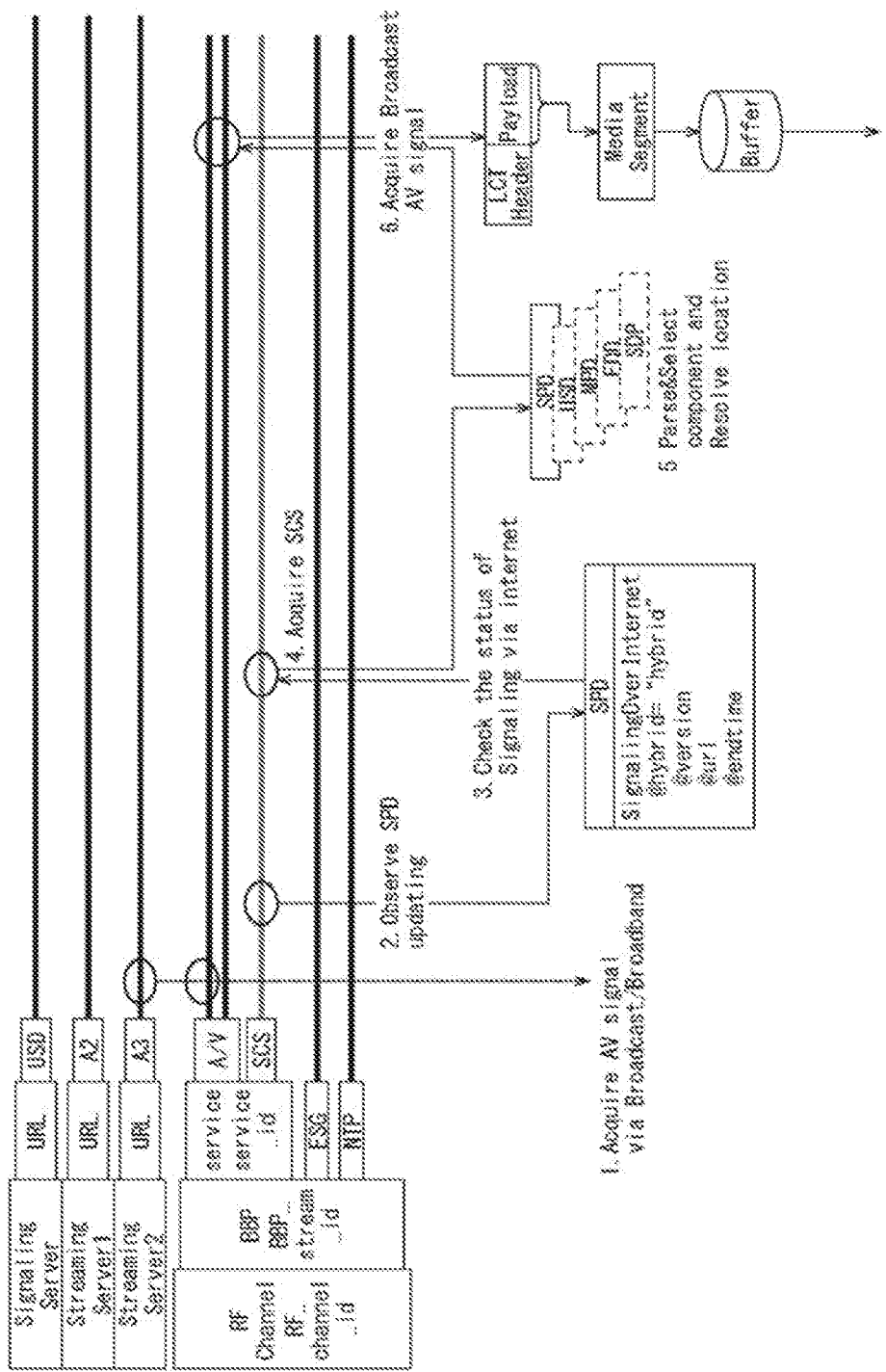
FIG. 13 A diagram for explaining another scenario in the case where a transition from the hybrid service to the basic service is made.

FIG. 13 is a diagram for explaining another scenario in the case where a transition from the hybrid service to the basic service is made.

FIG. 13 shows, as in FIG. 12, the scenario in the case where a transition from the hybrid service to the basic service is made. They are different in that the end of the communication acquisition of the signaling information is checked using the signaling information transmitted by communication in FIG. 12 while the end of the communication acquisition of the signaling information is checked using the signaling information transmitted by broadcasting in FIG. 13.

Specifically, at the receiver placed in each house or the like, the particular service selected by the user is a hybrid service, and hence a video component transmitted by broadcasting and a component of the audio 3 transmitted by communication from the streaming server (Streaming Server2) are acquired by using the signaling information transmitted by communication. With this, at the receiver, a picture of a program corresponding to the hybrid service is displayed and at the same time sound corresponding to the audio 3 synchronized with that picture is output (Procedure 1). Note that this Procedure 1 corresponds to, in the case of Solution 1, the procedures in the channel selection scenario of FIG. 5 and corresponds to, in the case of Solution 2, the procedures in the channel selection scenario of FIG. 8.

The receiver is capable of acquiring the signaling information (SCS) transmitted by broadcasting according to the SCS Bootstrap information of the SCD, and the contents of the SignalingOverinternet element described in the SPD are constantly monitored (Procedure 2). Then, the receiver checks the attribute value of the endtime attribute of the SPD, to thereby check whether or not to terminate the communication acquisition of the signaling information (Procedure 3). At the receiver, if the communication acquisition of the signaling information is terminated, the signaling information (SCS) transmitted by broadcasting is acquired according to the SCS Bootstrap information of the SCD (Procedure 4). That is, the signaling information is changed from the communication acquisition to the broadcasting acquisition and a transition from the hybrid service to the basic service is made.

Then, at the receiver, the video and audio components transmitted by broadcasting are acquired by using signaling information (SCS) transmitted by broadcasting (Procedures 5 and 6). With this, at the receiver, a picture of a program corresponding to the basic service is displayed and at the same time sound synchronized with that picture is output. Note that those Procedures 5 and 6 correspond to, in the case of Solution 1, the procedures in the channel selection scenario of FIG. 4 and correspond to, in the case of Solution 2, the procedures in the channel selection scenario of FIG. 7.

As described above, in the case where a transition from the hybrid service to the basic service is made, in the hybrid service before transition, the video and audio components are being delivered by broadcasting and communication, and hence the information relating to those components is described in the signaling information transmitted by communication. Therefore, the receiver acquires the video and audio components (streams) on the basis of the signaling information transmitted by communication. At this time, in this signaling information, the information items relating to the components transmitted by broadcasting and communication are both described. In the case of the signaling information transmitted by communication, there is less need to worry about the data size in comparison with the signaling information transmitted by broadcasting. Thus, this is not an issue.

On the other hand, in the basic service after transition, the video and audio components are delivered only by broadcasting, and hence the information relating to those components is being described in the signaling information (SCS) transmitted by broadcasting. Therefore, the receiver acquires the video and audio components (streams) on the basis of the signaling information transmitted by broadcasting. At this time, only the information relating to the components being transmitted by broadcasting is described in this signaling information, and hence the increase in data size can be suppressed.

<5. Syntax>

(1) Syntax of SCD

FIG. 14 is a diagram showing a syntax of the SCD. Note that the SCD of FIG. 14 is common to Solution 1 and Solution 2.

The SCD is described with a markup language, for example, an XML. Note that, in FIG. 14, "@" is added to the attribute out of the element and the attribute. Further, the indented elements and attributes are those specified with respect to upper-level elements thereof. The same relationship between them applies to other syntaxes to be described later.

As shown in FIG. 14, the Scd element is an upper-level element of majorProtocolversion attribute, minorProtocolversion attribute, RFchannelId attribute, name attribute, Tuning_RF element, and BBPStream element.

In the majorProtocolversion attribute and the minorProtocolversion attribute, protocol version information is specified. In the RFchannelId attribute, an RF channel ID of a broadcasting station in units of physical channels is specified. In the name attribute, the name of the broadcasting station in units of physical channels is specified.

In the Tuning_RF element, information relating to the channel selection is specified. The Tuning_RF element is an upper-level element of frequency attribute and PreambleL1Pre attribute. In the frequency attribute, a frequency in selecting a predetermined bandwidth is specified. In the PreambleL1Pre attribute, control information of a physical layer is specified.

In the BBPStream element, information relating to one or more BBP streams is specified. The BBPStream element is an upper-level element of bbpStreamId attribute, payloadType attribute, name attribute, ESGBootstrap element, ClockReferenceInformation element, Tuning_BBPS element, and Service element.

In the bbpStreamId attribute, a BBP stream ID is specified. If a plurality of BBP streams are provided, they are identified by bbpStreamId attributes. In the payloadType attribute, a payload type of the BBP stream is specified. For example, "ipv4," "ipv6," or "ts" is specified as this payload type. "Ipv4" indicates IPv4 (Internet Protocol version 4). "Ipv6" indicates IPv6 (Internet Protocol Version 6). "Ts" indicates a TS (Transport Stream). In the name attribute, the name of the BBP stream is specified.

In the ESGBootstrap element, information on access to the ESG is specified. The ESGBootstrap element is an upper-level element of an ESGProvider element. In the ESGProvider element, information relating to the ESG is specified for each ESG provider. The ESGProvider element is an upper-level element of providerName attribute, ESGBroadcastLocation element, and ESGBroadbandLocation element.

In the providerName attribute, the name of the ESG provider is specified. If an ESG is transmitted by broadcasting, The ESGBroadcastLocation element specifies an ESG service, using RFchannelId attribute, BBPStreamId attribute, and ESGServiceId attribute (triplet). In the RFchannelId attribute, an RF channel ID of a broadcasting station that transmits the ESG service is specified. In the BBPStreamId attribute, an BBP stream ID of a BBP stream that transmits the ESG service is specified. In the ESGServiceId attribute, a service ID of the ESG service is specified.

If an ESG is transmitted by communication, the ESGBroadbandLocation element specifies a URL for accessing a file of that ESG, using a ESG url attribute.

In the ClockReferenceInformation element, information relating to time information (e.g., NTP) is specified. The ClockReferenceInformation element is an upper-level element of sourceIPAddress attribute, destinationIPAddress attribute, portNum attribute, and clockReferenceFormat attribute.

In the sourceIPAddress attribute and the destinationIPAddress attribute, IP addresses of source and destination for transmitting the time information are specified. In the portNum attribute, a port number for transmitting the time information is specified. In the clockReferenceFormat attribute, type information of the time information is specified. For example, "NTPnormal" or "NTP27M" is specified as this type information. "NTPnormal" indicates a normal NTP. Further, "NTP27M" indicates adaptability for a reference clock of 27 MHz of a PCR (Program Clock Reference).

In the Tuning_BBPS element, the information relating to the channel selection for each BBP stream is specified. The Tuning_BBPS element is an upper-level element of plpId attribute and PreambleL1post element. In the plpId attribute, an PLP ID for identifying the BBP stream is specified. Note that the PLP ID corresponds to the BBP stream ID. In the PreambleL1post element, control information of the physical layer is specified.

In the Service element, information relating to one or more services is specified. The Service element is an upper-level element of serviceId attribute, serviceType attribute, hidden attribute, hiddenGuide attribute, shortName attribute, longName attribute, accesControl attribute, SourceOrigin element, SCS bootstrap element, SignalingOverinternet element, and Associated Service element.

In the serviceId attribute, the service ID is specified. If a plurality of services are provided, they are identified by serviceId attributes. In the serviceType attribute, type information of the service is specified. For example, "continuous," "scripted," or "esg" is specified as this type information. "Continuous" indicates a video/audio service. "Scripted" indicates an NRT service. "Esg" indicates an ESG service.

In the hidden attribute and the hiddenGuide attribute, whether or not the service identified by the service ID is a hidden service is specified. If "on" is specified as those attribute values, that service is set not to be displayed.

Further, if "off" is specified as those attribute values, that service is displayed. For example, if "on" is specified as the hidden attribute, that service is set not to be selected by an operation of a remote controller. Further, for example, if "on" is specified as the hiddenGuide attribute, that service is set not to be displayed in the ESG.

In the shortName attribute and the longName attribute, the service identified by the name of the service ID is specified. It should be noted that, in the shortName attribute, the name of the name of the service has to be specified with at most seven letters. In the accesControl attribute, whether or not the service identified by the service ID has been encrypted is specified. If "on" is specified as the accesControl attribute, it indicates that that service has been encrypted and, if "off" is specified, it indicates that that service has not been encrypted.

In the SourceOrigin element, information for identifying the service is specified. The SourceOrigin element is an upper-level element of country attribute, original RFchannelId attribute, bbpStreamId attribute, and serviceId attribute. In the country attribute, a country code is specified. In the original RFchannelId attribute, an original RF channel ID is specified. The original RF channel ID is an ID for identifying the broadcasting network and the same value is used therefor also when that service is re-transmitted. In the bbpStreamId attribute, the BBP stream ID is specified. In the serviceId attribute, the service ID is specified. That is, using he country code, original RF channel ID, BBP stream ID, and service ID, a specific ID can be assigned to each service.

In an SCS Bootstrap element, information on access to the service is specified. The SCS Bootstrap element is an upper-level element of hybrid attribute, sourceIPAddress attribute, destinationIPAddress attribute, portNum attribute, and tsi attribute. In the hybrid attribute, information indicating whether or not the signaling information adapted for the hybrid service is specified. For example, if "basic" is specified as the hybrid attribute, it indicates adaptability for the basic service and, if "hybrid" is specified as the hybrid attribute, it indicates adaptability for the hybrid service. In the sourceIPAddress attribute and the destinationIPAddress attribute, IP addresses of source and destination for transmitting the time information are specified. In the portNum attribute, the port number for transmitting the SCS is specified. In the tsi attribute, the TSI in the FLUTE session that transmits the SCS is specified.

In the SignalingOverinternet element, information relating to the signaling information transmitted by communication is specified. The SignalingOverinternet element is an upper-level element of hybrid attribute and url attribute. In the hybrid attribute, information indicating whether or not the signaling information adapted for the hybrid service is specified. For example, "basic" is specified as the hybrid attribute, it indicates adaptability for the basic service and, if "hybrid" is specified as the hybrid attribute, it indicates adaptability for the hybrid service. In the url attribute, a URL indicating an acquisition source of the signaling information is specified. For example, in the url attribute, a URL of the signaling server is specified.

In the Associated Service element, information relating to an associated slave service is specified. The Associated Service element is an upper-level element of RFchannelId attribute, bbpStreamId attribute, and serviceId attribute. In the RFchannelId attribute, an RF channel ID of the associated slave service is specified. In the bbpStreamId attribute, a BBP stream ID of the associated slave service is specified. In the serviceId attribute, a service ID of the associated slave service is specified.

In FIG. 14, regarding cardinality, when "1" is specified, only one element or attribute is necessarily specified. When "0 . . . 1" is specified, it is optional whether to specify an element or attribute. When "1 . . . n" is specified, one or more elements or attributes are specified. When "0 . . . n" is specified, it is optional whether to specify one or more elements or attributes. The same meanings of the cardinality as described above apply to other syntaxes to be described later.

(2) Syntax of SPD (Syntax of SPD According to Solution 1)

FIG. 15 is a diagram showing a syntax of the SPD according to Solution 1. That is, the SPD of FIG. 15 can be used in the channel selection scenario of the basic service of FIG. 4 or the channel selection scenario of the hybrid service of FIG. 5 that is described above. Note that the SCD is described with a markup language, for example, an XML.

As shown in FIG. 15, an Spd element is an upper-level element of serviceId attribute, spindicator attribute, ProtocolVersionDescriptor element, NRTServiceDescriptor element, CapabilityDescriptor element, IconDescriptor element, ISO639LanguageDescriptor element, ReceiverTargetingDescriptor element, AssociatedServiceDescriptor element, ContentAdvisoryDescriptor element, and SignalingOverinternet element.

In the serviceId attribute, the service ID is specified. In the spindicator attribute, whether or not each service identified by the service ID has been encrypted is specified. If "on" is specified as the spindicator attribute, it indicates that that service has been encrypted. If "off" is specified, it indicates that that service has not been encrypted.

In the ProtocolVersionDescriptor element, information for indicating what kind of service the data service is is specified. In the NRTServiceDescriptor element, information relating to the NRT service is specified. In the CapabilityDescriptor element, information relating to a function (capability) required of the receiver that receives the provided NRT service is specified.

In the IconDescriptor element, information indicating an acquisition source of an icon used in the NRT service is specified. In the ISO639LanguageDescriptor element, a language code of the NRT service is specified. In the ReceiverTargetingDescriptor element, target information on the NRT service is specified.

In the AssociatedServiceDescriptor element, information relating to the associated slave service is specified. In the ContentAdvisoryDescriptor element, information relating to the rating region is specified.

In the SignalingOverinternet element, information relating to the signaling information transmitted by communication is specified. The SignalingOverinternet element is an upper-level element of hybrid attribute, version attribute, and url attribute. In the hybrid attribute, information indicating whether or not it is the signaling information adapted for the hybrid service is specified. For example, "basic" is specified as the hybrid attribute, it indicates adaptability for the basic service and, if "hybrid" is specified as the hybrid attribute, it indicates adaptability for the hybrid service. In the version attribute, version information of the signaling information is specified. In the url attribute, a URL indicating an acquisition source of the signaling information is specified. For example, in the url attribute, a URL of the signaling server is specified.

In the SPD, the various parameters at the service level are defined by the above-mentioned Descriptor elements. Note that, in FIG. 15, the ProtocolVersionDescriptor element, NRTServiceDescriptor element, CapabilityDescriptor element, IconDescriptor element, ISO639LanguageDescriptor element, and ReceiverTargetingDescriptor element are those defined for the NRT service.

(Syntax of SPD According to Solution 2)

FIG. 16 is a diagram showing a syntax of the SPD according to Solution 2. That is, the SPD of FIG. 16 can be used in the channel selection scenario of the basic service of FIG. 7 or the channel selection scenario of the hybrid service of FIG. 8 that is described above.

As shown in FIG. 16, an Spd element is an upper-level element of serviceId attribute, spindicator attribute, ProtocolVersionDescriptor element, NRTServiceDescriptor element, CapabilityDescriptor element, IconDescriptor element, ISO639LanguageDescriptor element, ReceiverTargetingDescriptor element, AssociatedServiceDescriptor element, ContentAdvisoryDescriptor element, SignalingOverinternet element, and Component element.

In the SPD of FIG. 16, the various parameters at the service level and the component level are defined. The parameter at the service level is the same as the SPD of FIG. 15.

For example, in the SignalingOverinternet element, information relating to the signaling information transmitted by communication is specified. The SignalingOverinternet element is an upper-level element of hybrid attribute, version attribute, and url attribute. In the hybrid attribute, information indicating whether or not it is the signaling information adapted for the hybrid service is specified. For example, if "basic" is specified as the hybrid attribute, it indicates adaptability for the basic service and, if "hybrid" is specified as the hybrid attribute, it indicates adaptability for the hybrid service. In the version attribute, version information of the signaling information is specified. In the url attribute, a URL indicating an acquisition source of the signaling information is specified. For example, in the url attribute, a URL of the signaling server is specified.

Note that the elements other than the SignalingOverinternet element are also the same as the SPD of FIG. 15, and hence duplicated descriptions thereof will be omitted. In the SPD of In FIG. 16, the various parameters at the component level are defined by the Component element.

The Component element is an upper-level element of componentId attribute, componentType attribute, componentEncription attribute, ComponentLocation element, TargetedDeviceDescriptor element, ContentAdvisoryDescriptor element, VideoParameters element, AudioParameters element, and CaptionParameters element.

In the componentId attribute, a component ID used for associating a component with another component in another table is specified. In the componentType attribute, type information of the component is specified. In the componentEncription attribute, whether or not each component identified by the component ID has been encrypted is specified. If "on" is specified as the componentEncription attribute, it indicates that that component has been encrypted. If "off" is specified, it indicates that that component has not been encrypted.

In the ComponentLocation element, component location information is specified. Note that the detailed contents of the ComponentLocation element will be described later with reference to FIG. 17. In the TargetedDeviceDescriptor element, information relating to the display of the device as a target is specified. In the ContentAdvisoryDescriptor element, rating information in units of components is specified.

In the VideoParameters element, video parameters are specified. The VideoParameters element is an upper-level element of AVCVideoDescriptor element and HEVCVideoDescriptor element. That is, if AVC (Advanced Video Coding) is used as the encoding method for the video data, the AVCVideoDescriptor element is specified, and, if HEVC (High Efficiency Video Coding) is used as the encoding method for the video data, the HEVCVideoDescriptor element is specified. Note that the AVC and HEVC are examples of the encoding method for the video data, and, if another encoding method is used, the corresponding Video Descriptor element will be specified.

In the AudioParameters element, audio parameters are specified. The AudioParameters element is an upper-level element of MPEG4AACAudioDescriptor element and AC3AudioDescriptor element. That is, if MPEG4AAC (Advanced Audio Coding) is used as the encoding method for the audio data, the MPEG4AACAudioDescriptor element is specified, and, if AC3 (Audio Code number 3) is used as the encoding method for the audio data, the AC3AudioDescriptor element is specified. Note that the MPEG4AAC and AC3 are examples of the encoding method for the audio data, and, if another encoding method is used, the corresponding AudioDescriptor element will be specified.

In the CaptionParameters element, closed caption parameters are specified.

(Detailed Contents of ComponentLocation element)

FIG. 17 is a diagram showing detailed contents of the ComponentLocation element of FIG. 16.

In the ComponentLocation element, component location information is specified. The ComponentLocation element is an upper-level element of portNumber attribute, tsi attribute, startToi attribute, and endToi attribute. In the portNumber attribute, a port number of a targeted component is specified. In the tsi attribute, an TSI of a FLUTE session in which a targeted component is transmitted is specified. In the startToi attribute, the start value of the TOI in the case where the TOI is changed in a time sequence is specified. In the endToi attribute, the end value of the TOI in the case where the TOI is changed in a time sequence is specified. That is, by specifying the startToi attribute and the endToi attribute, the value thereof is sequentially incremented from the start value to the end value of the TOI.

(Syntax of SPD Common to Solutions 1 and 2)

FIG. 18 is a diagram showing a syntax of the SPD common to Solutions 1 and 2. That is, the SPD of FIG. 18 can be used in the scenario of FIG. 10, the scenario of FIG. 12, or the like that is described above.

As shown in FIG. 18, the Spd element is an upper-level element of serviceId attribute, spindicator attribute, ProtocolVersionDescriptor element, NRTServiceDescriptor element, CapabilityDescriptor element, IconDescriptor element, ISO639LanguageDescriptor element, ReceiverTargetingDescriptor element, AssociatedServiceDescriptor element, ContentAdvisoryDescriptor element, and SignalingOverinternet element.

Although the various parameters at the service level are defined in the SPD of FIG. 18, descriptions of the parameters at the service level, which have the same contents as the SPD of FIG. 15 for Solution 1, will be duplicated. Therefore, descriptions thereof will be appropriately omitted. That is, the SPD of FIG. 18 is different from the contents of the SignalingOverinternet element in comparison with the SPD of FIG. 15. Further, the description portion before the Component element in the SPD of FIG. 16 for Solution 2 will be replaced by the syntax of the SPD of FIG. 18. That is, the SPD of FIG. 18 is different from the contents of the SignalingOverinternet element in comparison with the SPD of FIG. 16.

In the SignalingOverinternet element, information relating to the signaling information transmitted by communication is specified. The SignalingOverinternet element is an upper-level element of hybrid attribute, version attribute, url attribute, minUpdatePeriod attribute, and endtime attribute. In the hybrid attribute, information indicating whether or not it is the signaling information adapted for the hybrid service is specified. For example, if "basic" is specified as the hybrid attribute, it indicates adaptability for the basic service and, if "hybrid" is specified as the hybrid attribute, it indicates adaptability for the hybrid service.

In the version attribute, version information of the signaling information is specified. In the url attribute, a URL indicating an acquisition source of the signaling information is specified. For example, in the url attribute, a URL of the signaling server is specified. In the minUpdatePeriod attribute, information indicating an update interval of the signaling information is specified. In the endtime attribute, information indicating the point of time of the end of the communication acquisition of the signaling information is specified.

Next, referring to FIGS. 19 to 31, a detailed structure of the Descriptor element described in the SPD will be described. Note that each Descriptor element is described with a markup language, for example, an XML. Further, in FIGS. 19 to 31, "@" is added to the attribute out of the element and the attribute. Further, the indented elements and attributes are those specified with respect to upper-level elements thereof.

(Protocol Version Descriptor)

FIG. 19 is a diagram showing a syntax of a Protocol Version Descriptor.

In a Protocol Version Descriptor element, information for indicating what kind of service the data service is is specified. The Protocol Version Descriptor element is an upper-level element of protocolIdentifier attribute, majorProtocolVersion attribute, and minorProtocolVersion attribute.

In the protocolIdentifier attribute, type information of the format of the data service is specified. For example, "A/90," "NRT" is specified as this type information. "A/90" indicates a method of transmitting universal data. Further, "NRT" indicates a method of transmitting NRT (Non-Real Time).

In the majorProtocolVersion attribute and the minorProtocolVersion attribute, the version of the data service is specified. In the majorProtocolVersion attribute, a major version is specified. In the minorProtocolVersion attribute, a minor version is specified.

(NRT Service Descriptor)

FIG. 20 is a diagram showing a syntax of an NRT Service Descriptor.

In the NRTServiceDescriptor element, information relating to the NRT service is specified. The NRTServiceDescriptor element is an upper-level element of ConsumptionModel attribute, autoUpdate attribute, storageReservarion attribute, and defaultContentSize attribute.

In the ConsumptionModel attribute, a transmission mode of the NRT service is specified. For example, "B&D," "push," "portal," "triggered" is specified as this transmission mode. "B&D" is the abbreviation of Browse and Download and a mode for downloading file data of an NRT content selected by the user. "Push" is a mode for providing a contracted NRT service as a push type. "Portal" is a mode for transmitting and immediately displaying an HTML file or the like. "Triggered" is a mode for providing the application.

In the autoUpdate attribute, whether or not the NRT service has been automatically updated is specified. If "on" is specified as the autoUpdate attribute, it indicates that that NRT service is automatically updated. If "off" is specified, it indicates that NRT service is not automatically updated. In the storageReservarion attribute, a necessary storage volume is specified. The size per NRT content is specified in the defaultContentSize attribute.

(Capability Descriptor)

FIG. 21 is a diagram showing a syntax of a Capability Descriptor.

In the Capability Descriptor element, information relating to the function (capability) required of the receiver that receives the provided NRT service is specified. The Capability Descriptor element is an upper-level element of IndivisualCapabilityCodes element, IndivisualCapabilityString element, and CapabilityOrSets element.

The IndivisualCapabilityCodes element is an upper-level element of essentialIndicator attribute, capabilityCode attribute, and formatIdentifier attribute. In the essentialIndicator attribute, information indicating whether or not the capability is essential is specified. In the capabilityCode attribute, the code of the capability determined in advance is specified. That is, whether or not the capability specified by the code of the capability is essential is specified by the essentialIndicator attribute and capabilityCode attribute. In the formatIdentifier attribute, if a code of the capability is arbitrarily specified, a function (capability) that should be assessed is specified.

The IndivisualCapabilityString element is an upper-level element of essentialIndicator attribute, capabilityCategoryCode attribute, and capabilityString attribute. In the essentialIndicator attribute, information indicating whether or not the capability is essential is specified. In the capabilityCategoryCode attribute, a code for each category of the capability is specified. That is, by the essentialIndicator attribute and the capabilityCategoryCode attribute, whether or not the capability specified by the code for each category of the capability is essential is specified. In the capabilityString attribute, the function (capability) that should be assessed is specified for each category of the capability.

The CapabilityOrSets element is specified in the case of specifying the assessment for each code of the capability by the above-mentioned IndivisualCapabilityCodes element and the assessment for each code of the category of the capability by the IndivisualCapabilityString element with OR logic. Therefore, although the CapabilityOrSets element is an upper-level element of essentialIndicator attribute, CapabilityCodesInSets element, and CapabilityStringsInSets element, the essentialIndicator attribute corresponds to the above-mentioned essentialIndicator attribute.

Further, capabilityCode attribute and formatIdentifier attribute in the CapabilityCodesInSets element correspond to the capabilityCode attribute and the formatIdentifier attribute in the above-mentioned IndivisualCapabilityCodes element, respectively. In addition, capabilityCategoryCode attribute and capabilityString attribute in the CapabilityStringsInSets element correspond to the capabilityCategoryCode attribute and the capabilityString attribute in the above-mentioned IndivisualCapabilityString element, respectively.

(Icon Descriptor)

FIG. 22 is a diagram showing a syntax of an Icon Descriptor.

In the IconDescriptor element, the information indicating the acquisition source of the icon used in the NRT service is specified. The IconDescriptor element is an upper-level element of a content linkage attribute. In the content linkage attribute, a URL indicating the acquisition source of the icon is specified.

(ISO-639 Language Descriptor)

FIG. 23 is a diagram showing a syntax of an ISO-639 Language Descriptor.

In the ISO639LanguageDescriptor element, a language code of the NRT service is specified. The ISO639LanguageDescriptor element is an upper-level element of a languageCode attribute. In the languageCode attribute, a language code defined by ISO 639 is specified.

(Receiver Targeting Descriptor)

FIG. 24 is a diagram showing a syntax of a Receiver Targeting Descriptor.

In the ReceiverTargetingDescriptor element, target information on the NRT service is specified. The ReceiverTargetingDescriptor element is an upper-level element of a TargetEntry element. The TargetEntry element is an upper-level element of geoLocation attribute, postalCode attribute, and demographic category attribute.

In the geoLocation attribute, a geographical position as a target of the NRT service is specified. In the postalCode attribute, a postal code of a region as the target of the NRT service is specified. In the demographic category attribute, a category of users as targets of the NRT service is specified. For example, "males," "females," or "Ages 12-17" is specified as this category. "Males" indicates that the targets of the NRT service are males. "Females" indicates that the targets of the NRT service are females. "Ages 12-17" indicates that the targets of the NRT service are 12 to 17 years old.

(Associated Service Descriptor)

FIG. 25 is a diagram showing a syntax of an Associated Service Descriptor.

In the AssociatedServiceDescriptor element, the information relating to the associated slave service is specified. The AssociatedServiceDescriptor element is the upper-level element of the RFchannelId attribute, BBPStreamId attribute, and serviceId attribute. In the RFchannelId attribute, an RF channel ID is specified. In the BBPStreamId attribute, a BBP stream ID is specified. In the serviceId attribute, a service ID is specified. That is, the associated slave service is specified by the triplet.

(Content Advisory Descriptor)

FIG. 26 is a diagram showing a syntax of a Content Advisory Descriptor.

In a Content Advisory Descriptor element, information relating to the rating region is specified. The Content Advisory Descriptor element is the upper-level element of the version attribute and RatingRegion element. In the version attribute, RRT version information is specified.

The RatingRegion element is an upper-level element of the ratingRegionId attribute and RatingDimension element. In the ratingRegionId attribute, a rating region ID is specified. The RatingDimension element is an upper-level element of dimensionIndex attribute, ratingValue attribute, and ratingTag attribute. Rating information, for example, how to set the age limit is specified by those attributes.

(AVC Video Descriptor)

FIG. 27 is a diagram showing a syntax of an AVC Video Descriptor.

If AVC is used as the encoding method for the video data, in the AVC Video Descriptor element, information relating to the contents of a AVC codec is specified. An AVCVideo Descriptor element is an upper-level element of profileIdc attribute, constraintSet0 attribute, constraintSet1 attribute, constraintSet2 attribute, AVCCompatibleFlags attribute, levelIdc attribute, stillPresent attribute, and 24HourPicture attribute.

Information relating to the contents of the AVC codec is specified by those attributes.

(HEVC Video Descriptor)

FIG. 28 is a diagram showing a syntax of an HEVC Video Descriptor.

If HEVC is used as the encoding method for the video data, information relating to the contents of an HEVC codec is specified in the HEVCVideoDescriptor element. The HEVCVideoDescriptor element is an upper-level element of profileSpace attribute, tierFlag attribute, profileIdc attribute, profileCompatibilityIndication attribute, progressiveSourceFlag attribute, nonPackedConstraintFlag attribute, frameOnlyConstraintFlag attribute, levelIdc attribute, temporalLayerSubsetFlag attribute, stillPresent attribute, 24HourPicture attribute, temporalIdMin attribute, and temporalIdMax attribute. Information relating to the contents of the HEVC codec is specified as those attributes.

(MPEG4 AAC Audio Descriptor)

FIG. 29 is a diagram showing a syntax of an MPEG4 AAC Audio Descriptor.

If MPEG4AAC is used as the encoding method for the audio data, information relating to the contents of an AAC codec is specified in the MPEG4AACAudioDescriptor element. The MPEG4AACAudioDescriptor element is an upper-level attribute of profile attribute, level attribute, channelConfig attribute, AACServiceType attribute, receiverMixRqd attribute, mainId attribute, asvc attribute, language attribute, and componentName attribute. Information relating to the contents of the AAC codec is specified by those attributes.

(AC3 Audio Descriptor)

FIG. 30 is a diagram showing a syntax of an AC3 Audio Descriptor.

If AC3 is used as the encoding method for the audio data, in the AC3AudioDescriptor element, information relating to the contents of an AC3 codec is specified. The AC3AudioDescriptor element is an upper-level element of sampleRateCode attribute, bsId attribute, bitRateCode attribute, bsMod attribute, numChannels attribute, fullSvc attribute, langcod attribute, mainId attribute, priority attribute, textCod attribute, and language attribute. Information relating to the contents of the AC3 codec is specified by those attributes.

(Caption Parameters)

FIG. 31 is a diagram showing a syntax of Caption Parameters.

In a Caption Parameters element, information relating to the contents of the closed caption is specified. The Caption Parameters element is an upper-level element of captionServiceNumber attribute, language attribute, easyReader attribute, and wideAspectRatio attribute. Information relating to the contents of the closed caption is specified by those attributes.

Note that the syntaxes of the SCD, the SPD, and the Descriptor elements of the SPD that are described above with reference to FIGS. 14 to 31 are examples and other syntaxes can be employed.

<6. System Configuration>
(Configuration of Broadcast Communication System)

Figure 32:
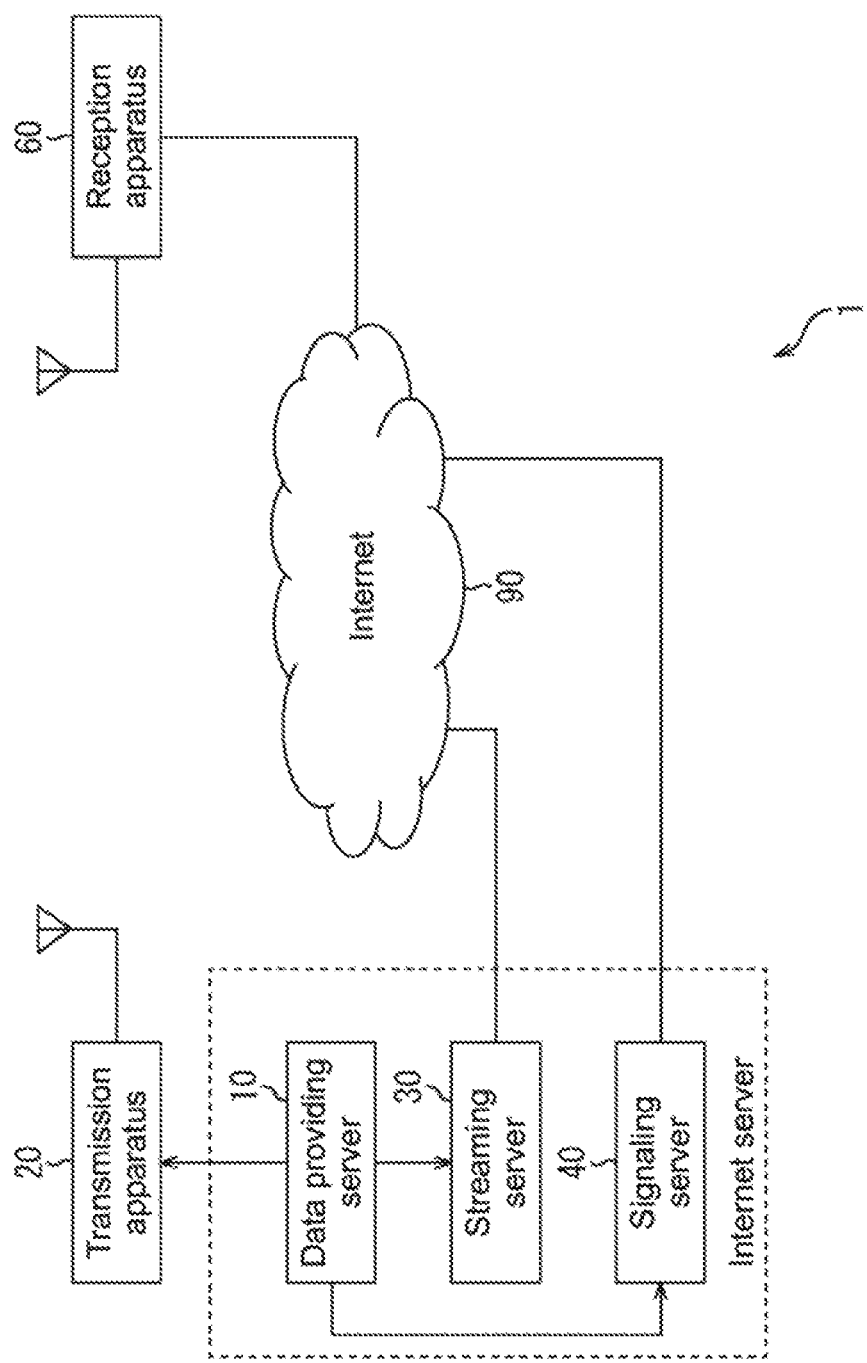
FIG. 32 A diagram showing a configuration example of a broadcast communication system.

FIG. 32 is a diagram showing a configuration example of the broadcast communication system.

As shown in FIG. 32, a broadcast communication system 1 is constituted of a data providing server 10, a transmission apparatus 20, a streaming server 30, a signaling server 40, and a reception apparatus 60. In FIG. 32, the reception apparatus 60 is mutually connected to the streaming server 30 and the signaling server 40 via the Internet 90. Note that, in FIG. 32, the data providing server 10, the streaming server 30, and the signaling server 40 constitute the Internet server.

The data providing server 10 provides components such as video data and audio data to the transmission apparatus 20 and the streaming server 30. Further, the data providing server 10 provides original data of signaling information to the transmission apparatus 20 and the signaling server 40.

The transmission apparatus 20 transmits the component provided from the data providing server 10, through a broadcast wave of the digital broadcasting using the IP transmission system. Further, the transmission apparatus 20 generates signaling information using the original data of the signaling information provided from the data providing server 10, and transmits it together with the component through a broadcast wave of the digital broadcasting using the IP transmission system. Note that the transmission apparatus 20 corresponds to the above-mentioned transmitter (e.g., FIG. 4) and is provided by, for example, the broadcaster.

In response to a request from the reception apparatus 60, the streaming server 30 streams and delivers the component provided from the data providing server 10, as a stream via the Internet 90. Note that the streaming server 30 corresponds to the above-mentioned streaming server (e.g., FIG. 5) and is provided by, for example, the broadcaster. Further, a plurality of streaming servers 30 can be placed depending on the application form.

The signaling server 40 generates signaling information using the original data of the signaling information provided from the data providing server 10. The signaling server 40 requests, in response to a request from the reception apparatus 60, the signaling information via the Internet 90. Note that the signaling server 40 corresponds to the above-mentioned signaling server (e.g., FIG. 5) and provided by, for example, the broadcaster. Further, a plurality of signaling servers 40 can be placed depending on the application form.

The reception apparatus 60 receives a broadcast wave of the digital broadcasting that is transmitted from the transmission apparatus 20, and acquires the signaling information transmitted by that broadcast wave of the digital broadcasting. Further, the reception apparatus 60 accesses the signaling server 40 via the Internet 90, and acquires the signaling information provided from the signaling server 40.

On the basis of the signaling information acquired by broadcasting or communication, the reception apparatus 60 acquires the component transmitted by a broadcast wave of the digital broadcasting transmitted from the transmission apparatus 20 or the component streamed/delivered from the streaming server 30 via the Internet 90. The reception apparatus 60 displays, on the basis of the component acquired by broadcasting or communication, a picture on the display and outputs sound synchronized with that picture from the speaker.

Note that the reception apparatus 60 corresponds to the above-mentioned receiver (e.g., FIG. 4) and is placed in each house, for example. Further, the reception apparatus 60 may include a display and a speaker or may be incorporated in a television receiver, a video recorder, or the like.

The broadcast communication system 1 is thus configured. Next, detailed configurations of the respective apparatuses constituting the broadcast communication system 1 in FIG. 32 will be described.

(Configuration of Transmission Apparatus)

Figure 33:
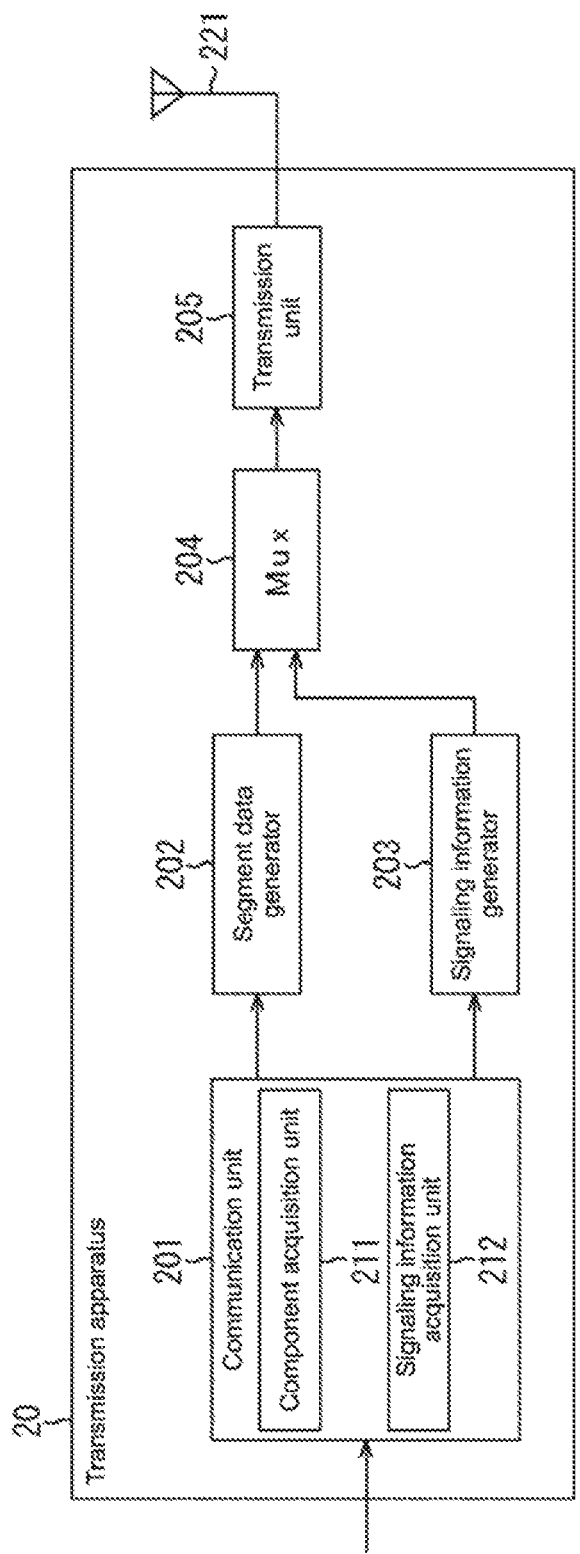
FIG. 33 A diagram showing a configuration example of a transmission apparatus.

FIG. 33 is a diagram showing a configuration example of the transmission apparatus of FIG. 32.

As shown in FIG. 33, the transmission apparatus 20 is constituted of a communication unit 201, a segment data generator 202, a signaling information generator 203, a Mux 204, and a transmission unit 205.

The communication unit 201 is constituted of a component acquisition unit 211 and a signaling information acquisition unit 212. The component acquisition unit 211 acquires video data and audio data provided from the data providing server 10, and supplies them to the segment data generator 202. Further, the signaling information acquisition unit 212 acquires the original data of the signaling information provided from the data providing server 10, and supplies it to the signaling information generator 203.

The segment data generator 202 generates, on the basis of the video data and the audio data supplied from the component acquisition unit 211, segment data, and supplies it to the Mux 204. The signaling information generator 203 generates, on the basis of the original data of the signaling information supplied from the signaling information acquisition unit 212, signaling information, and supplies it to the Mux 204. Note that the data providing server 10 may provide the signaling information itself rather than the original data of the signaling information. In this case, the signaling information acquired by the signaling information acquisition unit 212 is supplied to the Mux 204 as it is.

The Mux 204 multiplexes the segment data supplied from the segment data generator 202 and the signaling information supplied from the signaling information generator 203 to generate a BBP stream, and supplies it to the transmission unit 205. The transmission unit 205 modulates the BBP stream supplied from the Mux 204, and transmits it as a broadcast wave of the digital broadcasting using the IP transmission system via an antenna 221. Note that, at this time, the segment data and the signaling information (SCS) are, for example, transmitted through the FLUTE session.

(Configuration of Internet Server)

Figure 34:
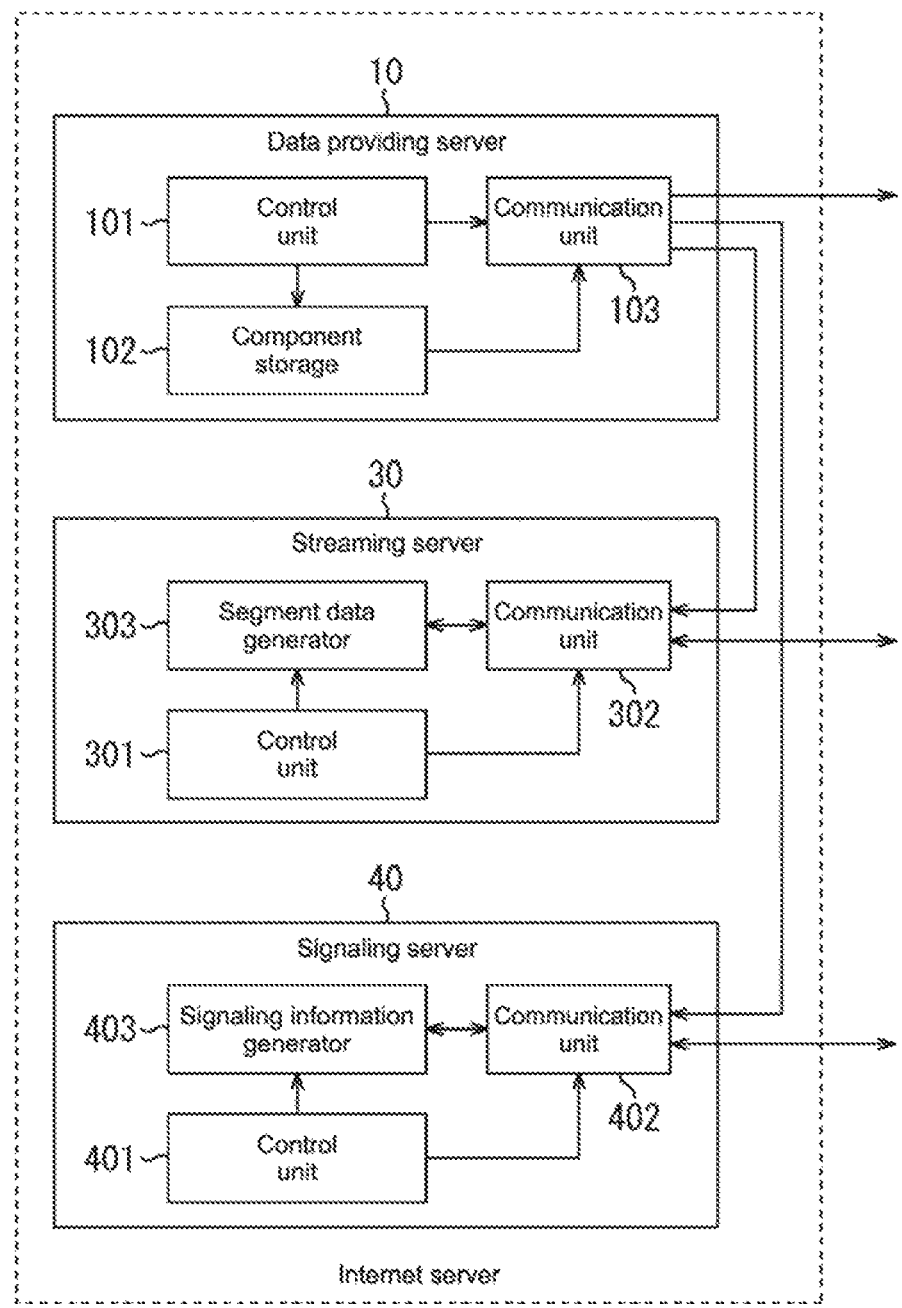
FIG. 34 A diagram showing a configuration example of an Internet server.

FIG. 34 is a diagram showing a configuration example of the Internet server of FIG. 32. As shown in FIG. 34, the Internet server is constituted of the data providing server 10, the streaming server 30, and the signaling server 40.

(Configuration of Data Providing Server)

The data providing server 10 is constituted of a control unit 101, component storage 102, and a communication unit 103. The control unit 101 controls operations of the respective units of the data providing server 10. The component storage 102 stores various components such as video data and audio data and the original data of the signaling information.

The communication unit 103 provides, under the control of the control unit 101, the components and the original data of the signaling information that are stored in the component storage 102, to the transmission apparatus 20. Further, the communication unit 103 provides, under the control of the control unit 101, the components stored in the component storage 102 to the streaming server 30. In addition, the communication unit 103 provides, under the control of the control unit 101, the original data of the signaling information stored in the component storage 102 to the signaling server 40.

(Configuration of Streaming Server)

The streaming server 30 is constituted of a control unit 301, a communication unit 302, and a segment data generator 303. The control unit 301 controls operations of the respective units of the streaming server 30. The communication unit 302 supplies, under the control of the control unit 301, the video data and the audio data provided from the data providing server 10 to the segment data generator 303.

The segment data generator 303 generates a segment data on the basis of the video data and the audio data supplied from the communication unit 302. The segment data generator 303 supplies, under the control of the control unit 301, the segment data to the communication unit 302. The communication unit 302 streams and delivers, in response to a request from the reception apparatus 60, the segment data supplied from the segment data generator 303 to the reception apparatus 60 via the Internet 90.

(Configuration of Signaling Server)

The signaling server 40 is constituted of a control unit 401, a communication unit 402, and a signaling information generator 403. The control unit 401 controls operations of the respective units of the signaling server 40. The communication unit 402 supplies, under the control of the control unit 401, the original data of the signaling information provided from the data providing server 10, to the signaling information generator 403.

The signaling information generator 403 generates signaling information on the basis of the original data of the signaling information supplied from the communication unit 402. The signaling information generator 403 supplies, under the control of the control unit 401, the signaling information to the communication unit 402. The communication unit 402 provides, in response to a request from the reception apparatus 60, the signaling information supplied from the signaling information generator 403, to the reception apparatus 60 via the Internet 90.

Note that, in FIGS. 32 and 34, for the sake of description, the data providing server 10, the streaming server 30, and the signaling server 40 are separate apparatuses as the Internet server. However, the Internet server only needs to include the functional configurations shown in FIG. 34, and, for example, the data providing server 10, the streaming server 30, and the signaling server 40 may be considered as a single apparatus. In this case, for example, the duplicated functions of the control unit, the communication unit, and the like can get together.

(Configuration of Reception Apparatus)

Figure 35:
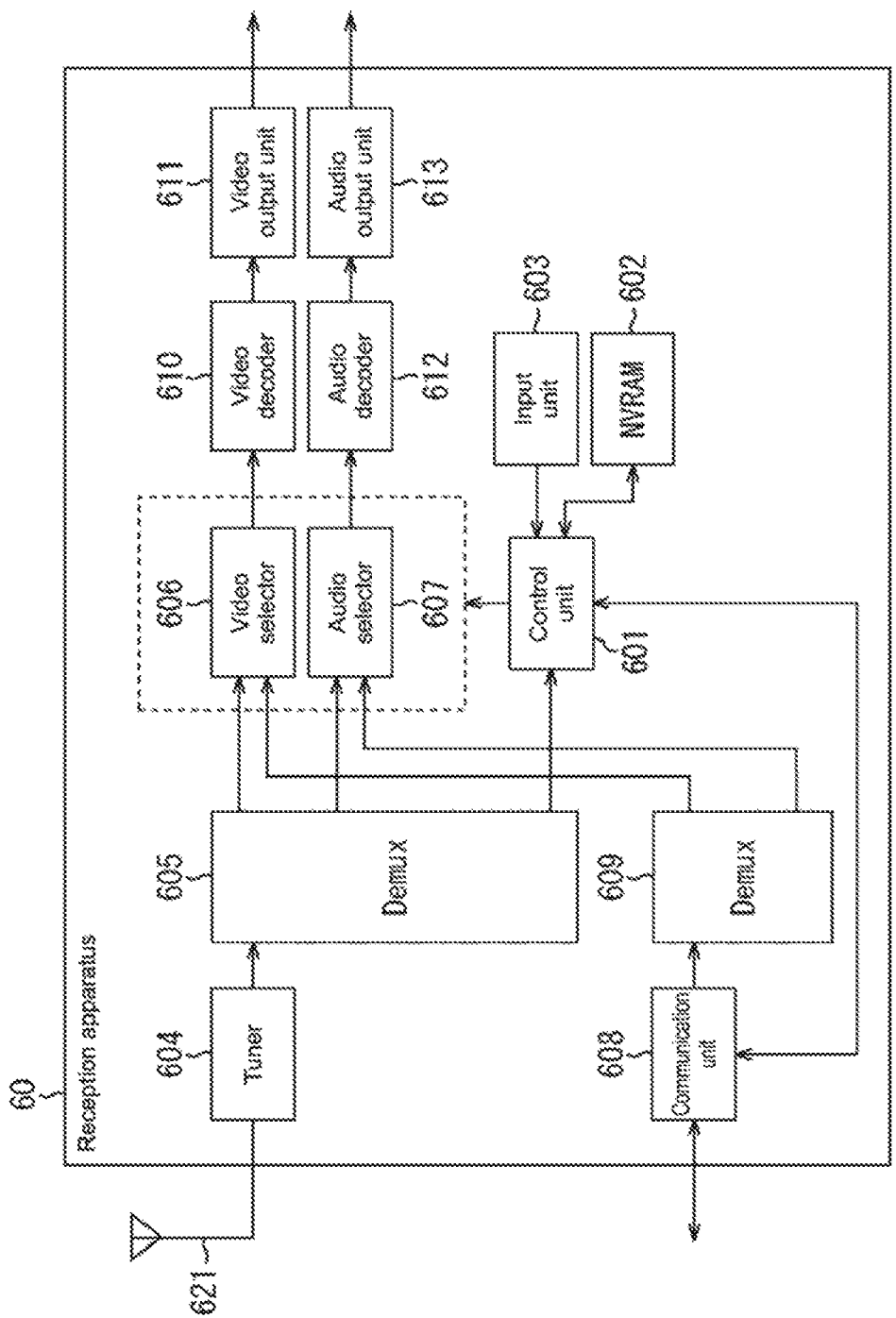
FIG. 35 A diagram showing a configuration example of a reception apparatus.

FIG. 35 is a diagram showing a configuration example of the reception apparatus of FIG. 32.

As shown in FIG. 35, the reception apparatus 60 is constituted of a control unit 601, an NVRAM 602, an input unit 603, a tuner 604, a Demux 605, a video selector 606, an audio selector 607, a communication unit 608, a Demux 609, a video decoder 610, a video output unit 611, an audio decoder 612, and an audio output unit 613.

The control unit 601 controls operations of the respective units of the reception apparatus 60. The NVRAM 602 is a nonvolatile memory and records various types of data under the control of the control unit 601. The input unit 603 supplies, according to user's operation, an operation signal to the control unit 601. The control unit 601 controls, on the basis of the operation signal supplied from the input unit 603, operations of the respective units of the reception apparatus 60.

Under the control of the control unit 601, the tuner 604 extracts, from a broadcast wave of the digital broadcasting using the IP transmission system received via an antenna 621, a broadcasting signal of a particular service, with respect to which a selection instruction has been made, and demodulates it, and supplies the resulting BBP stream to the Demux 605.

Under the control of the control unit 601, the Demux 605 demultiplexes the BBP stream supplied from the tuner 604 into the video data and the audio data and the signaling information and supplies the video data to the video selector 606 and the audio data to the audio selector 607. Further, the Demux 605 supplies the signaling information to the control unit 601. The control unit 601 controls, on the basis of the signaling information supplied from the Demux 605, operations of the respective units for acquiring the component transmitted by broadcasting.

Note that, if the segment data and the signaling information are being transmitted through the FLUTE session, the Demux 605 performs, under the control of the control unit 601, filtering processing using IP address, port number, TSI, TOI, and the like, to thereby obtain the video data and the audio data and the signaling information.

Under the control of the control unit 601, the communication unit 608 requests delivery of the stream from the streaming server 30, via the Internet 90. The communication unit 608 receives the stream streamed/delivered from the streaming server 30 via the Internet 90 and supplies it to the Demux 609.

The Demux 609 demultiplexes, under the control of the control unit 601, the stream supplied from the communication unit 608 into the video data and the audio data, and supplies the video data to the video selector 606 and supplies the audio data to the audio selector 607. Note that, for example, if the stream delivered from the streaming server 30 is only the audio, the Demux 609 supplies that audio data to the audio selector 607 without demultiplexing the component.

Further, under the control of the control unit 601, the communication unit 608 requests the signaling information from the signaling server 40 via the Internet 90. The communication unit 608 receives the signaling information transmitted from the signaling server 40 via the Internet 90 and supplies it to the control unit 601. On the basis of the signaling information supplied from the communication unit 608, the control unit 601 controls operations of the respective units for acquiring the component transmitted by broadcasting or communication.

Under the control of the control unit 601, the video selector 606 supplies either one of the video data supplied from the Demux 605 and the video data supplied from the Demux 609 to the video decoder 610.

The video decoder 610 decodes the video data supplied from the video selector 606 and supplies it to the video output unit 611. The video output unit 611 supplies the video data supplied from the video decoder 610 to a display (not shown) at the subsequent stage. With this, for example, the picture of the program is displayed on the display.

The audio selector 607 supplies, under the control of the control unit 601, either one of the audio data supplied from the Demux 605 and the audio data supplied from the Demux 609 to the audio decoder 612.

The audio decoder 612 decodes the audio data supplied from the audio selector 607 and supplies it to the audio output unit 613. The audio output unit 613 supplies the audio data supplied from the audio decoder 612 to a speaker (not shown) at the subsequent stage. With this, sound corresponding to the picture of the program, for example, is output from the speaker.

<7. Flows of Processing Executed by Apparatuses>

Next, a flow of processing executed by the respective apparatuses constituting the broadcast communication system 1 in FIG. 32 will be described with reference to the flowcharts in FIGS. 36 to 39.

(Transmission Processing)

Figure 36:
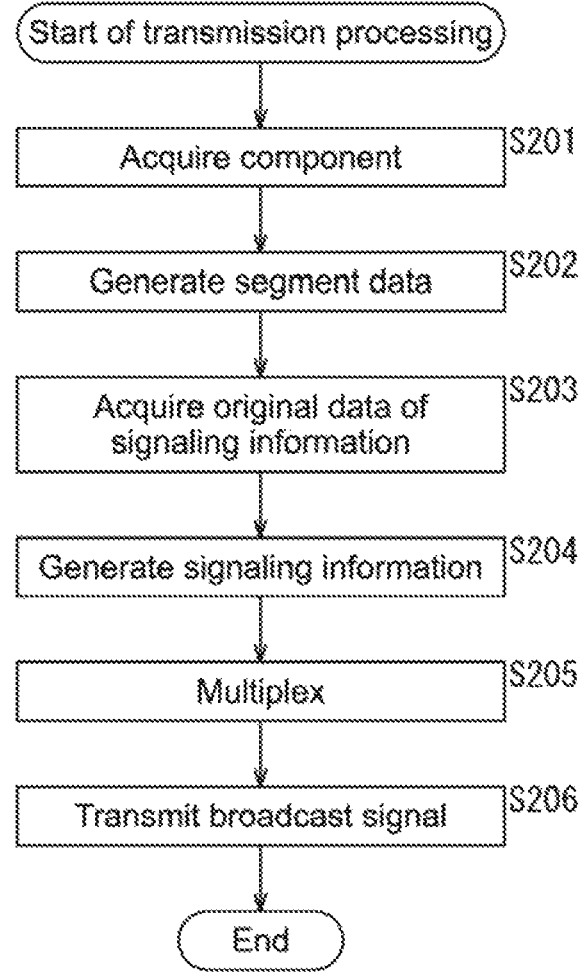
FIG. 36 A flowchart explaining transmission processing.

First, referring to a flowchart in FIG. 36, transmission processing executed by the transmission apparatus 20 of FIG. 32 will be described.

In Step S201, the component acquisition unit 211 acquires a component provided from the data providing server 10. Here, for example, video data and audio data are acquired as the component and supplied to the segment data generator 202. In Step S202, the segment data generator 202 generates segment data on the basis of the video data and the audio data supplied from the component acquisition unit 211, and supplies it to the Mux 204.

In Step S203, the signaling information acquisition unit 212 acquires the original data of the signaling information provided from the data providing server 10, and supplies it to the signaling information generator 203. In Step S204, the signaling information generator 203 generates the signaling information on the basis of the original data of the signaling information supplied from the signaling information acquisition unit 212, and supplies it to the Mux 204. Note that, if the signaling information is provided from the data providing server 10, the signaling information acquired by the signaling information acquisition unit 212 will be supplied to the Mux 204.

In Step S205, the Mux 204 multiplies the segment data supplied from the segment data generator 202 with the signaling information supplied from the signaling information generator 203, generates a BBP stream, and supplies it to the transmission unit 205. In Step S206, the transmission unit 205 modulates the BBP stream supplied from the Mux 204, and transmits it as a broadcast wave of the digital broadcasting using the IP transmission system, via the antenna 221.

Note that, at this time, the segment data and the signaling information (SCS) are, for example, transmitted through the FLUTE session. When the processing of Step S206 is terminated, the transmission processing of FIG. 36 is terminated.

In the above, the transmission processing has been described.

(Streaming Delivery Processing)

Figure 37:
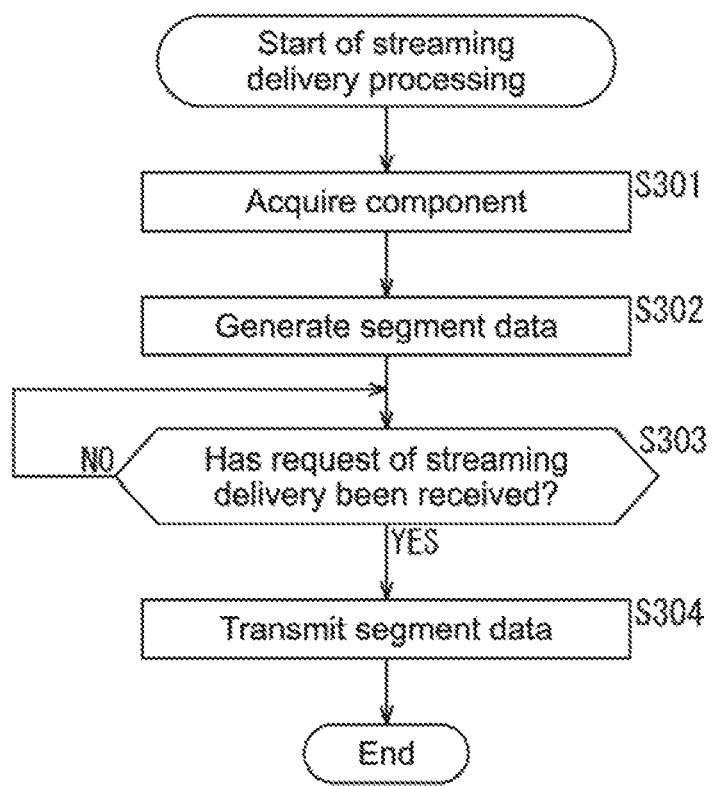
FIG. 37 A flowchart explaining streaming delivery processing.

Next, referring to a flowchart in FIG. 37, streaming delivery processing executed by the streaming server 30 of FIG. 32 will be described.

In Step S301, the communication unit 302 acquires, under the control of the control unit 301, the component provided from the data providing server 10. Here, for example, video data and audio data are acquired as the component and supplied to the segment data generator 303. In Step S302, under the control of the control unit 301, the segment data generator 303 generates segment data on the basis of the video data and the audio data supplied from the communication unit 302.

In Step S303, the control unit 301 monitors the communication condition of the communication unit 302, and determines whether or not a request of the streaming delivery has been received from the reception apparatus 60. In Step S303, after the request of the streaming delivery is received from the reception apparatus 60, the processing proceeds to Step S304.

In Step S304, under the control of the control unit 301, the communication unit 302 streams and delivers the segment data supplied from the segment data generator 303, as a stream via the Internet 90 to the reception apparatus 60. When the processing of Step S304 is terminated, the streaming delivery processing of FIG. 37 is terminated.

In the above, the streaming delivery processing has been described.

(Signaling Information-Providing Processing)

Figure 38:
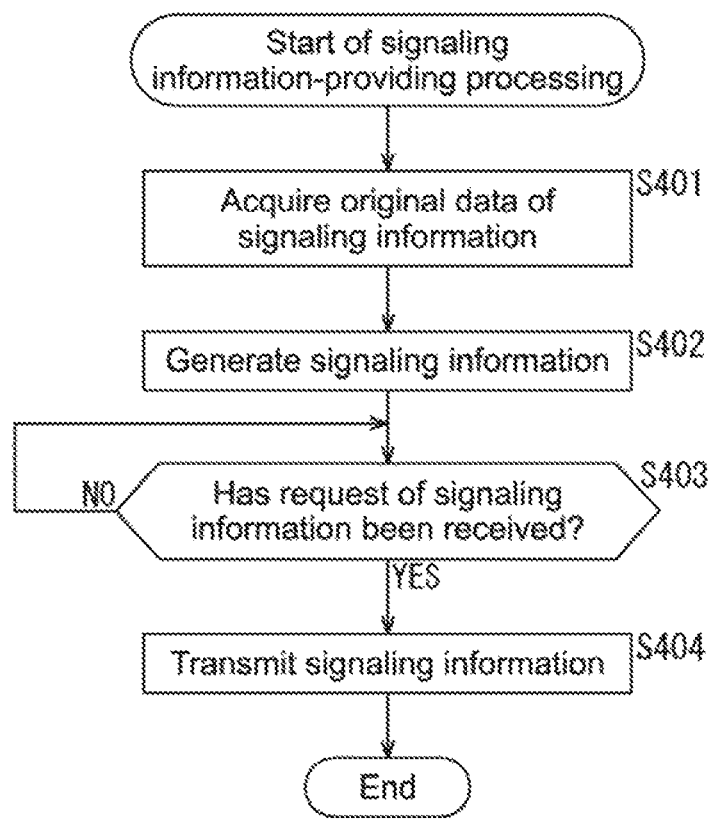
FIG. 38 A flowchart explaining signaling information-providing processing.

Next, referring to a flowchart in FIG. 38, the signaling information-providing processing executed by the signaling server 40 in FIG. 32 will be described.

In Step S401, the communication unit 402 acquires, under the control of the control unit 401, the original data of the signaling information provided from the data providing server 10, and supplies it to the signaling information generator 403. In Step S402, under the control of the control unit 401, the signaling information generator 403 generates signaling information on the basis of the original data of the signaling information supplied from the communication unit 402.

In Step S403, the control unit 401 monitors the communication condition of the communication unit 402, and determines whether or not a request of the signaling information has been received from the reception apparatus 60. In Step S403, after the request of the signaling information is received from the reception apparatus 60, the processing proceeds to Step S404.

In Step S404, under the control of the control unit 401, the communication unit 402 provides the signaling information supplied from the signaling information generator 403, to the reception apparatus 60 via the Internet 90. When the processing of Step S404 is terminated, the signaling information-providing processing of FIG. 38 is terminated.

In the above, the signaling information-providing processing has been described.

(Channel Selection Processing)

Figure 39:
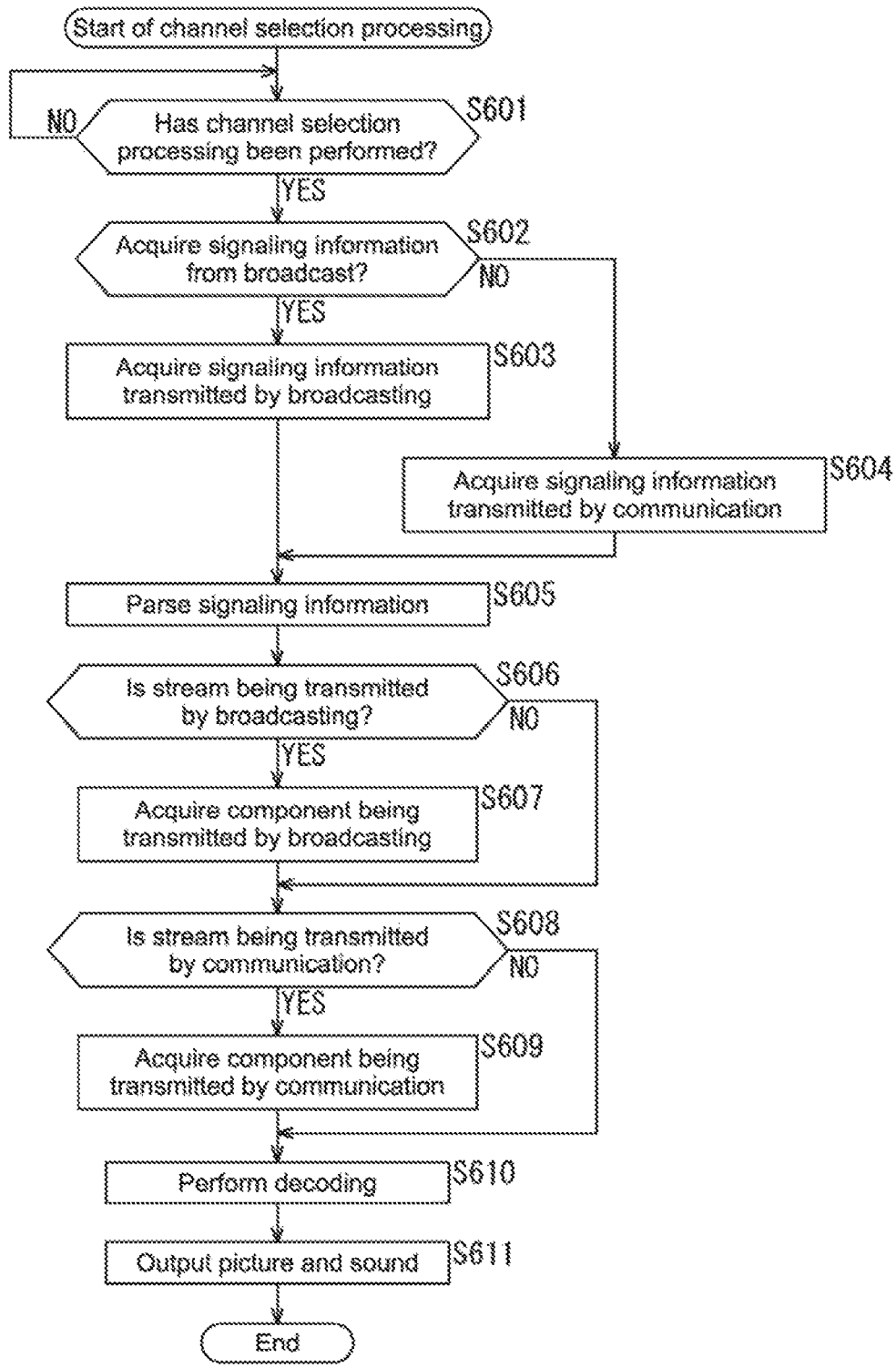
FIG. 39 A flowchart explaining channel selection processing.

Finally, referring to a flowchart in FIG. 39, channel selection processing executed by the reception apparatus 60 of FIG. 32 will be described. Note that, it is assumed that the initial scanning is performed preceding this channel selection processing in the reception apparatus 60, and channel selection information such as the SCD is recorded on the NVRAM 602.

In Step S601, on the basis of the operation signal supplied from the input unit 603, the control unit 601 determines whether or not a channel selection operation has been made by the user. In Step S601, for example, after the channel selection operation is made by user's operation with respect to the remote controller, the processing proceeds to Step S602. In Step S602, the control unit 601 determines whether or not to acquire the signaling information from the broadcast.

If it is in Step S602 determined to acquire the signaling information from the broadcast, the processing proceeds to Step S603. In Step S603, the control unit 601 controls the Demux 605 according to the SCS Bootstrap information of the SCD read out from the NVRAM 602, to be connected to the SCS being transmitted by broadcasting, and acquires the signaling information (SCS). Here, for example, in the case of the basic service (FIG. 4, etc.), the component transmitted by broadcasting is only acquired, and hence the signaling information transmitted by broadcasting is acquired.

On the other hand, if it is in Step S602 determined that the signaling information is acquired from the communication, the processing proceeds to Step S604. In Step S604, the control unit 601 controls the communication unit 608 according to the URL specified as the url attribute of the SignalingOverinternet element of the SCD read out from the NVRAM 602, and accesses the signaling server 40 via the Internet 90 to acquire the signaling information. Here, for example, in the case of the hybrid service (FIG. 5, etc.), the components transmitted by broadcasting and communication are acquired, and hence the signaling information transmitted by communication is acquired.

When the signaling information transmitted by broadcasting or communication is acquired by the processing of Step S603 or Step S604, the processing proceeds to Step S605. In Step S605, the control unit 601 parses the signaling information acquired in the processing of Step S603 or Step S604. By this parsing processing, an acquisition source of the video and audio components (streams) is determined.

In Step S606, according to the result of the parsing processing of Step S605, the control unit 601 determines whether or not the stream is being transmitted by broadcasting. If it is in Step S606 determined that the stream is being transmitted by broadcasting, the processing proceeds to Step S607.

In Step S607, the control unit 601 controls the tuner 604, the Demux 605, or the like to acquire the video and audio components transmitted by broadcasting. The thus acquired video data and audio data are supplied to the video selector 606 or the audio selector 607 at the subsequent stage. For example, in the basic service (FIG. 4, etc.) or the hybrid service (FIG. 5, etc.), the video and audio components are being transmitted by broadcasting, and hence the IP address, port number, TSI, and TOI for acquiring those components are determined. By being connected to the stream being transmitted through the FLUTE session, the segment data is acquired and the video data and the audio data are obtained.

Note that, if it is in Step S606 determined that the stream is not being transmitted by broadcasting, Step S607 is skipped and the processing proceeds to Step S608. In Step S608, according to the result of the parsing processing of Step S605, the control unit 601 determines whether or not the stream is being transmitted by communication. If it is in Step S608 determined that the stream is being transmitted by communication, the processing proceeds to Step S609.

In Step S609, the control unit 601 controls the communication unit 608, the Demux 609, or the like to acquire the video and audio components being transmitted by communication. The thus acquired video data and audio data are supplied to the video selector 606 or the audio selector 607 at the subsequent stage. For example, in the hybrid service (FIG. 5, etc.), the video and audio components are transmitted by communication. Therefore, by accessing the streaming server 30 via the Internet 90 according to the segment URL of the MPD and being connected to the video and the audio stream, the segment data is acquired and the video data and the audio data are obtained.

Note that, if it is in Step S608 determined that the stream is not transmitted by communication, Step S609 is skipped and the processing proceeds to Step S610. That is, by the processing of Steps S606 to S609, the component transmitted by broadcasting or communication is acquired and the video data and the audio data are obtained. Then, the video data is supplied to the video decoder 610 via the video selector 606, and the audio data is supplied to the audio decoder 612 via the audio selector 607.

In Step S610, the video decoder 610 decodes the video data supplied from the video selector 606, and supplies it to the video output unit 611. Further, the audio decoder 612 decodes the audio data supplied from the audio selector 607, and supplies it to the audio output unit 613.

In Step S611, the video output unit 611 supplies the video data supplied from the video decoder 610 to a display (not shown) at the subsequent stage. Further, the audio output unit 613 supplies the audio data supplied from the audio decoder 612 to a speaker (not shown) at the subsequent stage. With this, the picture such as the program is displayed on the display and sound synchronized with that picture is output from the speaker. When the processing of Step S611 is terminated, the channel selection processing of FIG. 39 is terminated.

In the above, the channel selection processing has been described.

Note that, although "D" that is the abbreviation of Description is used as the name of the signaling information in the above description, "T" that is the abbreviation of Table may be used. For example, the SCD (Service Configuration Description) may be described as an SCT (Service Configuration Table). Further, for example, the SPD (Service Parameter Description) may be described as an SPT (Service Parameter Table). It should be noted that the difference of those names is a formal difference between "Description" and "Table" and the substantial contents of the signaling information items are not different.

<8. Configuration of Computer>

The above-mentioned series of processing may be executed by hardware or may be executed by software. If the series of processing is executed by software, programs configuring that software are installed into a computer. FIG. 40 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

It should be noted that the present technology may take the following configurations.

(1)

A reception apparatus, including:

a reception unit that receives a broadcast wave of digital broadcasting using an IP (Internet Protocol) transmission system; and a control unit that controls, on the basis of information for managing only a broadcast component transmitted by a broadcast wave of the digital broadcasting, which is first signaling information transmitted by a broadcast wave of the digital broadcasting, or information for managing at least one component of the broadcast component and a communication component transmitted by communication, which is second signaling information transmitted by communication, operations of respective units for acquiring the at least one component of the broadcast component and the communication component.

(2)

The reception apparatus according to (1), in which, the first signaling information is information in units of services and includes a plurality of management information items for acquiring the broadcast component transmitted through a FLUTE (File Delivery over Unidirectional Transport) session.

(3)

The reception apparatus according to (1), in which the first signaling information is information in units of services and includes one management information item obtained by integrating a plurality of management information items for acquiring the broadcast component transmitted through a FLUTE session as a parameter defined at a component level.

(4)

The reception apparatus according to any one of (1) to (3), in which the first signaling information and the second signaling information include management information defining information relating to the second signaling information as a parameter at a service level.

(5)

The reception apparatus according to (4), in which the management information includes information indicating a range of signaling information, a version information, and a URL (Uniform Resource Locator) indicating an acquisition source, as the information relating to the second signaling information.

(6)

The reception apparatus according to (5), in which the management information further includes information indicating an update interval of the second signaling information, as the information relating to the second signaling information.

(7)

The reception apparatus according to (5) or (6), in which the management information further includes information indicating a timing to terminate acquisition of the second signaling information, as the information relating to the second signaling information.

(8)

The reception apparatus according to any one of (1) to (7), in which the second signaling information is information in units of services and includes a plurality of management information items for acquiring the broadcast component and an MPD (Media Presentation Description) complying with a standard of MPEG-DASH (Moving Picture Expert Group-Dynamic Adaptive Streaming over HTTP) as management information for acquiring the communication component.

(9)

The reception apparatus according to any one of (1) to (8), in which the first signaling information is transmitted in an upper layer than an IP layer in a hierarchy of a protocol in the IP transmission system, and a common IP address is assigned to the broadcast component configuring a particular service and the first signaling information.

(10)

A reception method for a reception apparatus, including the steps of:

receiving, by the reception apparatus, a broadcast wave of digital broadcasting using an IP transmission system; and controlling, on the basis of information for managing only a broadcast component transmitted by a broadcast wave of the digital broadcasting, which is first signaling information transmitted by a broadcast wave of the digital broadcasting, or information for managing at least one component of the broadcast component and a communication component transmitted by communication, which is second signaling information transmitted by communication, operations of respective units for acquiring the at least one component of the broadcast component and the communication component.

(11)

A transmission apparatus, including:

a first acquisition unit that acquires first signaling information for managing only a broadcast component transmitted by a broadcast wave of digital broadcasting using an IP transmission system;

a second acquisition unit that acquires one or more broadcast components configuring a service; and a transmission unit that transmits the first signaling information together with the broadcast component by a broadcast wave of the digital broadcasting using the IP transmission system.

(12)

The transmission apparatus according to (11), in which the first signaling information is information in units of services and includes a plurality of management information items for acquiring the broadcast component transmitted through a FLUTE session.

(13)

The transmission apparatus according to (11), in which the first signaling information is information in units of services and includes one management information item obtained by integrating a plurality of management information items for acquiring the broadcast component transmitted through a FLUTE session as a parameter defined at a component level.

(14)

The transmission apparatus according to any one of (11) to (13), in which a receiver that receives a broadcast wave of the digital broadcasting using the IP transmission system is capable of acquiring information for managing the at least one component of the broadcast component and a communication component transmitted by communication, which is second signaling information transmitted by communication, and the first signaling information and the second signaling information include management information defining information relating to the second signaling information as a parameter at a service level.

(15)

The transmission apparatus according to (14), in which the management information includes information indicating a range of signaling information, version information, and a URL of an acquisition source, as the information relating to the second signaling information.

(16)

The transmission apparatus according to (15), in which the management information further includes information indicating an update interval of the second signaling information, as the information relating to the second signaling information.

(17)

The transmission apparatus according to (15) or (16), in which the management information further includes information indicating a timing to terminate acquisition of the second signaling information, as the information relating to the second signaling information.

(18)

The transmission apparatus according to any one of (14) to (17), in which the second signaling information is information in units of services and includes an MPD complying with a standard of MPEG-DASH as the plurality of management information items for acquiring the broadcast component and the management information for acquiring the communication component.

(19)

The transmission apparatus according to any one of (11) to (18), in which the first signaling information is transmitted in an upper layer than an IP layer in a hierarchy of a protocol in the IP transmission system, and a common IP address is assigned to the broadcast component configuring a particular service and the first signaling information.

(20)

A transmission method for a transmission apparatus, including the steps of:

acquiring, by the transmission apparatus, first signaling information for managing only a broadcast component transmitted by a broadcast wave of digital broadcasting using an IP transmission system;

acquiring one or more broadcast components configuring the service; and transmitting the first signaling information together with the broadcast component by a broadcast wave of the digital broadcasting using the IP transmission system.

DESCRIPTION OF REFERENCE NUMERALS

1 broadcast communication system, 10 data providing server, 20 transmission apparatus, 30 streaming server, 40 signaling server, 60 reception apparatus, 90 Internet, 201 communication unit, 202 segment data generator, 203 signaling information generator, 204 Mux, 205 transmission unit, 601 control unit, 602 NVRAM, 604 tuner, 605 Demux, 606 video selector, 607 audio selector, 608 communication unit, 609 Demux, 610 video decoder, 611 video output unit, 612 audio decoder, 613 audio output unit, 900 computer, 901 CPU

The invention claimed is:

1. A reception apparatus, comprising:
one or more processors configured to:
receive a digital broadcast signal based on an Internet Protocol (IP) transmission system;
acquire service configuration information transmitted via the digital broadcast signal, the service configuration information including bootstrap information which includes IP address information and port information about first signaling information;
acquire the first signaling information transmitted via the digital broadcast signal based on the bootstrap information;
acquire at least one broadcast component transmitted via the digital broadcast signal based on the first signaling information;
acquire second signaling information based on the service configuration information;
acquire at least one communication component transmitted via the Internet based on the second signaling information; and
output the at least one broadcast component and the at least one communication component in sync with each other,
wherein the service configuration information includes a hybrid delivery indicator and location information about the second signaling information,
wherein the hybrid delivery indicator indicates a communication delivery of the second signaling information,
wherein the location information includes a piece of a uniform resource locator (URL) corresponding to a signaling server, and wherein the one or more processors are configured to acquire the second signaling information from the signaling server based on the location information.

2. The reception apparatus according to claim 1, wherein the first signaling information includes a plurality of management information items for acquisition of the at least one broadcast component transmitted via a File Delivery over Unidirectional Transport (FLUTE) session.

3. The reception apparatus according to claim 1, wherein the first signaling information includes one management information item obtained by integration of a plurality of management information items for acquisition of the at least one broadcast component transmitted via a FLUTE session as a parameter at a component level.

4. The reception apparatus according to claim 1, wherein the first signaling information and the second signaling information includes management information that indicates the second signaling information as a parameter.

5. The reception apparatus according to claim 4, wherein the management information indicates a range of signaling information, a version information, and a uniform resource locator (URL) indicating an acquisition source, as the information relating to the second signaling information.

6. The reception apparatus according to claim 5, wherein the management information further includes information indicating an update interval of the second signaling information as the information relating to the second signaling information.

7. The reception apparatus according to claim 1, wherein the second signaling information includes a Media Presentation Description (MPD) that complies with a standard of Moving Picture Expert Group-Dynamic Adaptive Streaming over HTTP (MPEG-DASH), the MPD including a segment uniform resource locator (URL) indicating a location of the at least one communication component.

8. The reception apparatus according to claim 1, wherein the first signaling information is transmitted in an upper layer higher than an IP layer in a hierarchy of a protocol in the IP transmission system, wherein a common IP address is assigned to the at least one broadcast component and the first signaling information, and wherein a particular service is executed based on the at least one broadcast component with the common IP address.

9. A reception method, the reception method comprising:
in a reception apparatus:
receiving a digital broadcast signal based on an Internet Protocol (IP) transmission system;
acquiring service configuration information transmitted via the digital broadcast signal, the service configuration information including bootstrap information which includes IP address information and port information about first signaling information;
acquiring the first signaling information transmitted via the digital broadcast signal based on the bootstrap information;
acquiring at least one broadcast component transmitted via the digital broadcast signal based on the first signaling information;
acquiring second signaling information based on the service configuration information;
acquiring at least one communication component transmitted via the Internet based on the second signaling information; and
outputting the at least one broadcast component and the at least one communication component in sync with each other,
wherein the service configuration information includes a hybrid delivery indicator and location information about the second signaling information,
wherein the hybrid delivery indicates a communication delivery of the second signaling information,
wherein the location information includes a piece of a uniform resource locator (URL) corresponding to a signaling server, and
wherein the second signaling information is acquired from the signaling server based on the location information.

10. A transmission apparatus, comprising:
one or more processors configured to:
acquire service configuration information including bootstrap information, the bootstrap information including IP address information and port information about first signaling information;
acquire the first signaling information to manage at least one broadcast component transmitted by a digital broadcast signal based on an Internet Protocol (IP) transmission system;
acquire the at least one broadcast component that configures a service; and transmit the service configuration information, the first signaling information, and the at least one broadcast component by the digital broadcast signal based on the IP transmission system,
wherein a receiver receives the digital broadcast signal and acquires the first signaling information from the digital broadcast signal based on the bootstrap information,
wherein the receiver acquires, based on the service configuration information, second signaling information from a signaling server,
wherein the second signaling information corresponds to management of a communication component,
wherein the service configuration information includes a hybrid delivery indicator and location information about the second signaling information,
wherein the hybrid delivery indicator indicates a communication delivery of the second signaling information,
wherein the location information includes a piece of a uniform resource locator (URL) corresponding to a signaling server, and
wherein the one or more processors are configured to acquire the second signaling information from the signaling server based on the location information.

11. The transmission apparatus according to claim 10, wherein the first signaling information includes a plurality of management information items for acquisition of the at least one broadcast component transmitted via a File Delivery over Unidirectional Transport (FLUTE) session.

12. The transmission apparatus according to claim 10, wherein the first signaling information includes one management information item obtained by integration of the plurality of management information items to acquire the at least one broadcast component transmitted via a FLUTE session as a parameter at a component level.

13. The transmission apparatus according to claim 10, wherein the first signaling information and the second signaling information includes management information that indicates the second signaling information as a parameter.

14. The transmission apparatus according to claim 13, wherein the management information indicates a range of signaling information, a version information, and a uniform resource locator (URL) indicating an acquisition source, as the information relating to the second signaling information.

15. The transmission apparatus according to claim 14, wherein the management information further includes information indicating an update interval of the second signaling information as the information relating to the second signaling information.

16. The transmission apparatus according to claim 13, wherein the second signaling information includes a Media Presentation Description (MPD) that complies with a standard of MPEG-DASH, MPD including a segment uniform resource locator (URL) indicating a location of the at least one broadcast component.

17. The transmission apparatus according to claim 10, wherein the first signaling information is transmitted in an upper layer higher than an IP layer in a hierarchy of a protocol in an IP transmission system, wherein a common IP address is assigned to the at least one broadcast component and the first signaling information, and wherein a particular service is executed based on the at least one broadcast component with the common IP address.

18. A transmission method, comprising:
in a transmission apparatus:
acquiring service configuration information including bootstrap information, the bootstrap information including IP address information and port information about first signaling information;

acquiring the first signaling information to manage at least one broadcast component transmitted by a digital broadcast signal based on an Internet Protocol (IP) transmission system;

acquiring the at least one broadcast component that configures a service; and the service configuration information, the first signaling information, and the at least one broadcast component by the digital broadcast signal based on the IP transmission system, wherein a receiver receives the digital broadcast signal and acquires the first signaling information from the digital broadcast signal based on the bootstrap information, wherein the receiver acquires, based on the service configuration information, second signaling information from a signaling server, wherein the second signaling information corresponds to management of the communication component, wherein the service configuration information includes a hybrid delivery indicator and location information about the second signaling information, wherein the hybrid delivery indicator indicates a communication delivery of the second signaling information, wherein the location information includes a piece of a uniform resource locator (URL) corresponding to a signaling server, and wherein the second signaling information is acquired from the signaling server based on the location information.

* * * * *